United States Patent
Bernini et al.

(10) Patent No.: US 9,991,547 B2
(45) Date of Patent: Jun. 5, 2018

(54) MACHINE AND PROCESS FOR OBTAINING CELLS FOR ELECTRIC STORAGE BATTERIES AND CELL FOR ELECTRIC STORAGE BATTERY

(71) Applicant: SOVEMA S.P.A., Villafranca (IT)

(72) Inventors: Pier Giuseppe Bernini, Moden (IT); Stefano Pol, Verona (IT)

(73) Assignee: SOVEMA GROUPS S.P.A., Villafranca (IT)

( * ) Notice: Subject to any disclaimer, the term of this patent is extended or adjusted under 35 U.S.C. 154(b) by 785 days.

(21) Appl. No.: 14/403,195

(22) PCT Filed: May 23, 2013

(86) PCT No.: PCT/IB2013/001025
§ 371 (c)(1),
(2) Date: Nov. 24, 2014

(87) PCT Pub. No.: WO2013/175296
PCT Pub. Date: Nov. 28, 2013

(65) Prior Publication Data
US 2015/0162638 A1    Jun. 11, 2015

(30) Foreign Application Priority Data

May 24, 2012 (IT) .............................. PD2012A0167

(51) Int. Cl.
H01M 10/04        (2006.01)
H01M 10/0583     (2010.01)
H01M 2/18          (2006.01)

(52) U.S. Cl.
CPC ... H01M 10/0404 (2013.01); H01M 10/0459 (2013.01); *H01M 2/18* (2013.01); *H01M 10/0583* (2013.01); *Y10T 29/53139* (2015.01)

(58) Field of Classification Search
CPC ......... H01M 10/0404; H01M 10/0459; H01M 2/18; H01M 10/0583; Y10T 29/53139
See application file for complete search history.

(56) References Cited

U.S. PATENT DOCUMENTS 5,563,007 A  * 10/1996  Young ..................... H01M 2/18
                                                                    29/623.2
6,589,300 B2     7/2003   Hong

FOREIGN PATENT DOCUMENTS

CN          2842758 Y      11/2006
CN        101355180 A        1/2009
(Continued)

*Primary Examiner* — Lisa S Park
(74) *Attorney, Agent, or Firm* — Mark M. Friedman

(57) ABSTRACT

Machine for obtaining cells for electric storage batteries, comprising an apparatus for feeding two continuous strips of dielectric material, a first and a second apparatus for distributing first electrodes of the same polarity and a third apparatus for distributing between the two strips second electrodes with opposite polarity with respect to the first electrodes. The machine further includes a folding head which receives, from the feeding apparatus, the two strips with the second electrode interposed, and is movable between a first position in which it receives a first electrode from the first distribution apparatus, and a second position (B), in which it receives a first electrode from the second distribution apparatus, in order to form a stack of composite layers alternated with the electrodes.

17 Claims, 15 Drawing Sheets

(56) References Cited

FOREIGN PATENT DOCUMENTS

| EP | 2425473 A2 | 3/2012 |
|----|------------|--------|
| WO | 2006/014989 A2 | 2/2006 |
| WO | 2010/126252 A2 | 11/2010 |
| WO | 2011/141852 A1 | 11/2011 |
| WO | 2012/020480 A1 | 2/2012 |
| WO | 2012020480 A1 | 2/2012 |

* cited by examiner

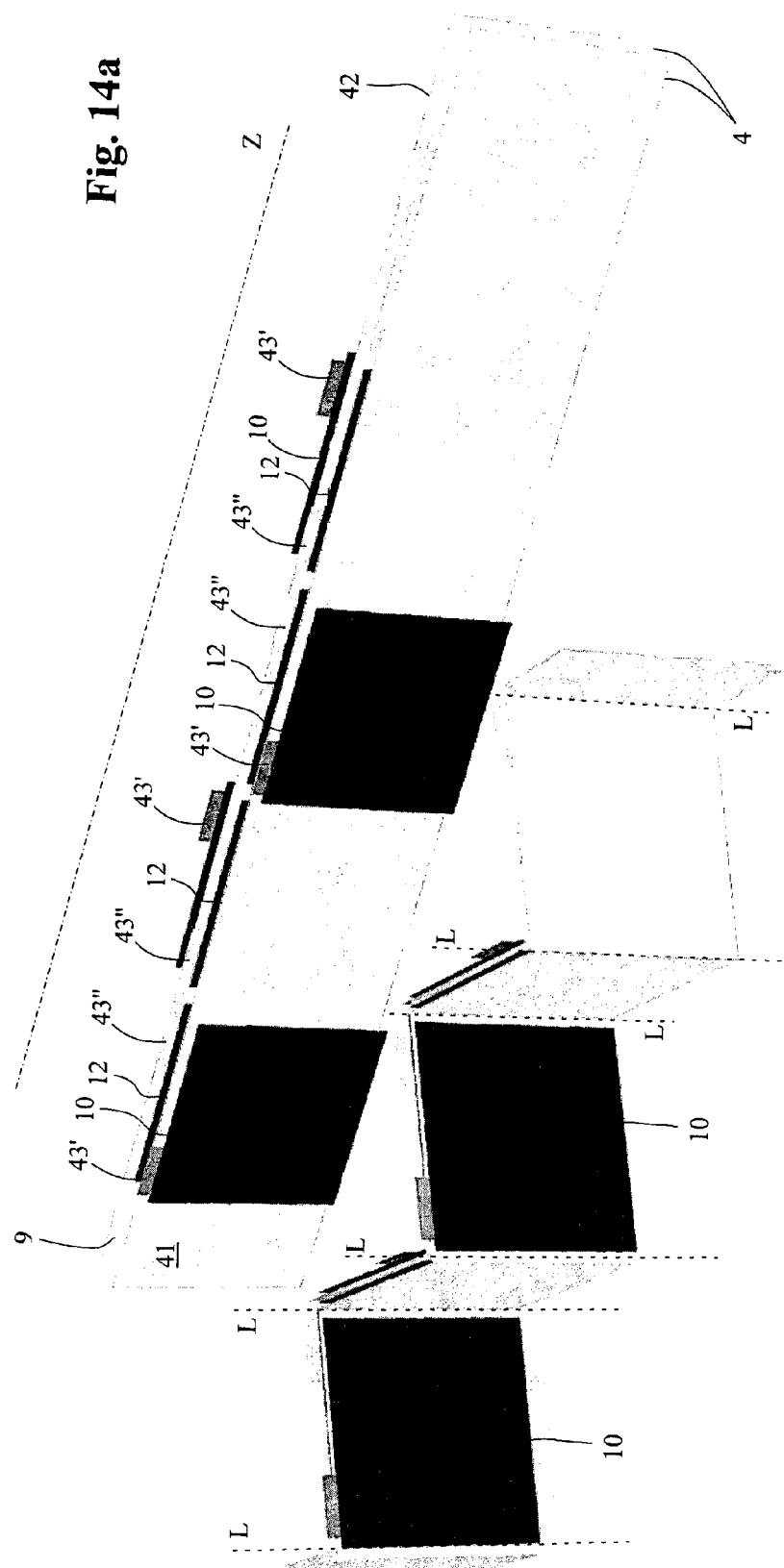

MACHINE AND PROCESS FOR OBTAINING CELLS FOR ELECTRIC STORAGE BATTERIES AND CELL FOR ELECTRIC STORAGE BATTERY

FIELD OF APPLICATION

The present invention regards a machine and a process for obtaining cells for electric storage batteries, as well as a cell for electric storage battery, according to the preamble of the respective independent claims.

The present machine and process are inserted in the industrial field of the production of electric storage batteries and are intended to be employed in the processes of production of cells for electric storage batteries in order to obtain stacks of positive and negative electrodes and arranged alternated with each other, with a dielectric separator interposed.

STATE OF THE ART

In the industrial field of the production of electric storage batteries, there is the particular need to obtain, by means of automated processes that are as quick as possible, cells for electric storage batteries constituted by stacks of positive and negative electrodes, arranged alternated on top of each other, with a separation layer made of dielectric material interposed, generally indicated in the technical jargon of the field with the term "separator".

A process is known for obtaining cells for electric storage batteries which provides for depositing, between the electrodes, separators formed by a single continuous strip of dielectric material, folded between the electrodes.

A process of the latter type known for the production of cells for electric storage batteries, in particular for rechargeable lithium batteries, is for example described in the U.S. Pat. No. 6,589,300. The process described herein provides for drawing a continuous strip of dielectric material from a coil and simultaneously depositing, by means of spraying, an adhesive on both faces of the dielectric material, at circumscribed areas spaced from each other on each face of the dielectric material. The areas of the dielectric material coated by the adhesive are intended to receive negative electrodes on a first face of the dielectric material and positive electrodes on the second face of the dielectric material and they are arranged at an equal distance from each other on each face of the dielectric material strip. The process then provides for simultaneously fixing a positive electrode and a negative electrode on the respective faces of the dielectric material at the areas on which the adhesive was deposited, for laminating the strip of dielectric material carrying the positive and negative electrodes fixed, and folding the dielectric material strip with fixed electrodes, in a manner so as to form a stack of negative and positive electrodes alternated with each other, between which the separators are interposed alternately formed by portions of the continuous dielectric material strip comprised between the electrodes and fixed thereto and by portions of the continuous strip folded above the electrodes.

Nevertheless, the process described in the U.S. Pat. No. 6,589,300 describes several drawbacks. The main drawback consists of the high costs for obtaining cells for electric storage batteries by means of such process, in particular due to the use of the adhesive for fixing the electrodes to the dielectric material.

In addition, the machine for obtaining cells for electric storage batteries by means of the aforesaid process requires a frequent cleaning and maintenance, since the adhesive sprayed on the strip of dielectric material and transported by the latter can easily dirty the parts of the machine nearest to the adhesive spraying station. Moreover, the cells for storage batteries obtained by means of such process, in addition to having high production costs as reported above, can also have poor efficiency, due to the reduced permeability to the ionic flow of the separators that have the adhesive deposited on the faces thereof.

In order to remedy the drawbacks of the process mentioned briefly above, processes have been recently designed for obtaining cells for electric storage batteries that while employing a continuous strip of dielectric material for forming the separators, do not provide for the deposition of adhesive on such strip for the fixing of the negative and positive electrodes thereto.

For example, the patent WO 2011/141852 describes a process and a machine for obtaining cells for electric storage batteries. The process described herein in particular provides for the arrangement of a continuous strip of dielectric material on which a plurality of positive and negative electrodes are arranged according to a pre-established sequence, spaced from each other. Such process provides that the dielectric material strip is wound around a first electrode in order to obtain a stack of alternated positive and negative electrodes, between which the separators are interposed that are defined by portions of a same continuous strip of dielectric material substantially wound as a spiral between the electrodes.

The machine described herein comprises a device for winding the strip of dielectric material and forming the stack of electrodes and separators; such winding device comprises gripping means adapted to grasp the first electrode arranged on the dielectric material strip and adapted to rotate in order to wind the dielectric material strip supporting the remaining electrodes around the first electrode.

Also the process and the machine described briefly above have in practice proven to be not lacking in drawbacks.

A first drawback of the process consists of the fact that it is necessary to arrange the electrodes on the strip of dielectric material according to a precise pre-established sequence, so as to prevent the electrodes having the same polarity from being situated adjacent to each other at the end of the forming of the stack of electrodes and separators.

A second drawback of the process lies in the fact that the electrodes must be arranged on the strip of dielectric material at a variable distance from each other and particularly at an increasing distance, in order to account for the fact that, as the winding continues, the thickness of the stack of electrodes increases and hence it is necessary to employ a greater quantity of dielectric material for winding the entire stack. It is therefore evident that the process described in the patent WO 2011/141852 is particularly difficult to carry out.

The machine described in the aforesaid patent is structurally complex to obtain, in particular having to comprise rotating gripping means.

Also known in the present industrial field is a process for producing cells for electric storage batteries that is termed "zigzag stacking", which provides for depositing a first negative or positive electrode on a first end edge of a dielectric material strip, for folding the aforesaid strip to coat the first electrode, then for depositing a second electrode having opposite polarity with respect to the polarity of the first electrode and for newly folding the strip of dielectric material to coat the second electrode. Such operations are repeated until a stack of electrodes and separators is obtained having the desired number of electrodes, in which the separators are defined by portions of the same continuous strip of dielectric material, folded in a zigzag manner between the electrodes.

However, the process of known type described briefly above is rather slow in execution and therefore has poor efficiency, which translates into high production costs of the cells for electric storage batteries obtained by means of such process.

PRESENTATION OF THE INVENTION

In this situation, the problem underlying the present invention is that of overcoming the drawbacks manifested by the processes, by the machines and by the cells for electric storage batteries of known type by providing a process for obtaining cells for electric storage batteries that have high efficiency.

Another object of the present invention is to provide a process that allows obtaining cells for electric storage batteries in a quick and simple manner.

A further object of the present invention is to provide a machine for obtaining cells for electric storage batteries, which allows obtaining stacks of electrodes and separators with high production capacity.

Another object of the present invention is to provide a machine for obtaining cells for electric storage batteries, which is structurally simple, entirely reliable in operation and which requires little maintenance.

A further object of the present invention is to provide a cell for electric storage battery which is provided with high efficiency and has low production costs.

These and still other objects are achieved by the process and by the machine for obtaining cells for electric storage batteries, as well as by the cell for electric storage battery, object of the present invention.

BRIEF DESCRIPTION OF THE DRAWINGS

The technical characteristics of the finding, according to the aforesaid objects, can be clearly seen in the contents of the below-reported claims and the advantages thereof are more evident in the following detailed description, made with reference to the enclosed drawings, which represent several merely exemplifying and non-limiting embodiments thereof, in which:

FIGS. 14a-14c show a cell for electric storage battery according to the present invention respectively in a first perspective view in an extended configuration, in a second perspective view in a partially folded configuration and in a third perspective view in a stacked configuration;

DETAILED DESCRIPTION OF A PREFERRED EMBODIMENT

Figure 1:
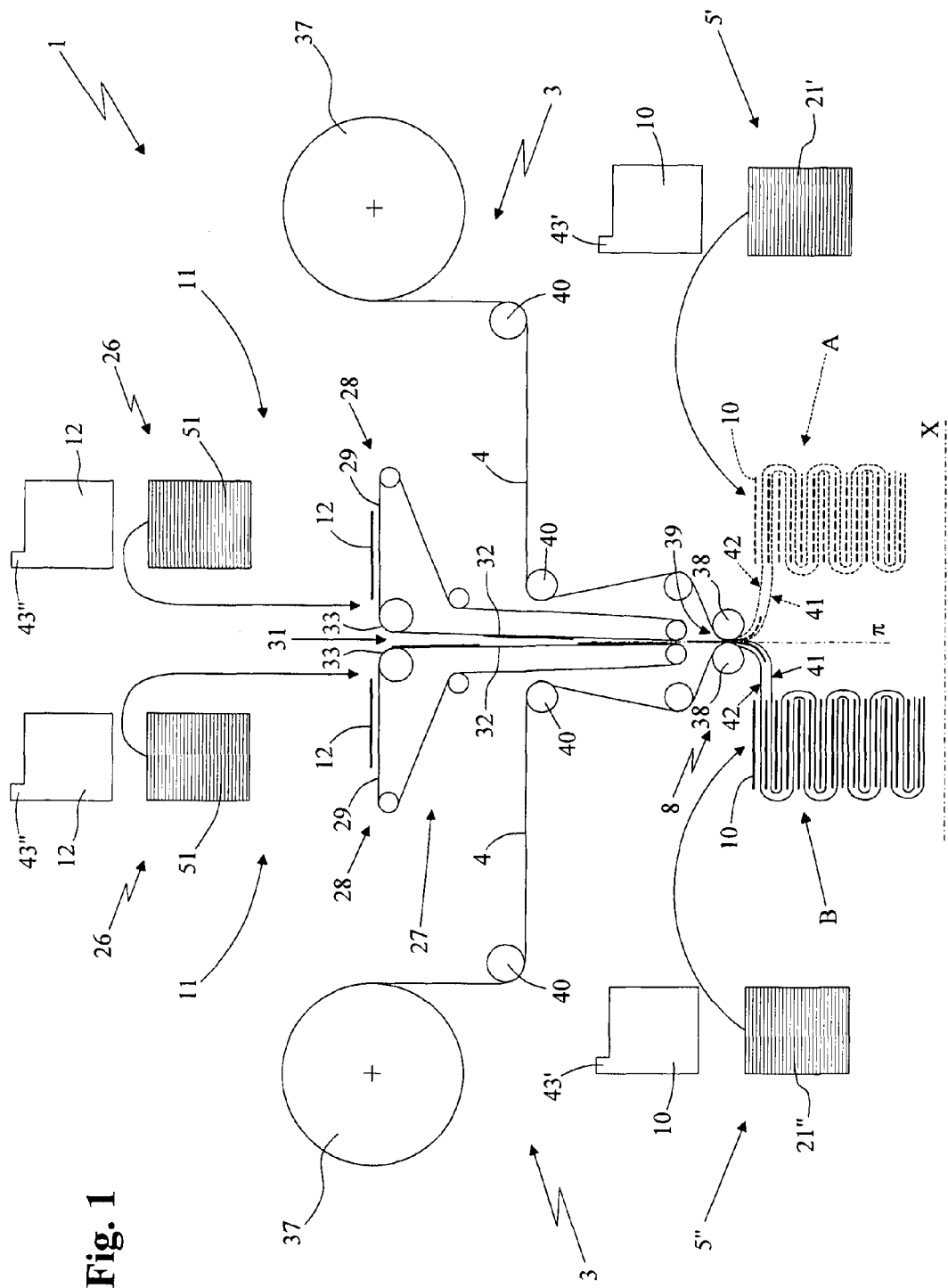
FIG. 1 shows a simplified schematic view of a first embodiment of a machine for obtaining cells for electric storage batteries, according to the present invention, with first and second electrodes as arranged in provided storage areas illustrated in plan view.

With reference to the set of enclosed drawings, a machine for obtaining cells for electric storage batteries, object of the present invention, is indicated in its entirety with the reference number 1.

The cells made by this machine are advantageously intended to be employed in conventional processes for the formation of electric storage batteries and particularly for the formation of lithium storage batteries.

Such processes generally comprise the obtainment of a plurality of cells, the connection in series or in parallel of multiple cells and the arrangement of the same in a protection casing, usually made of polymer material.

With the term "cell" it must be intended a stack of positive and negative electrodes, in a desired number, arranged alternated and with a separator interposed between each pair of adjacent electrodes with opposite polarity.

With the term "separator" it must be intended, in the scope of the present invention, the portion of a membrane of dielectric material arranged between two adjacent electrodes of opposite polarity, adapted to electrically separate the electrodes but permeable to the ionic flow.

Each of the electrodes employed in obtaining cells for electric storage batteries according to the present invention is provided, in a per se known manner, with an electrical collector, e.g. in the form of a tongue projecting from one side of the main body of the electrode.

With particular reference to the enclosed figures, the machine 1 is provided with a support structure 2 set on the ground, which supports a feeding apparatus 3 adapted to release one or more continuous strips 4 of dielectric material, a first and a second apparatus 5' and 5" for distributing electrodes and a folding head 6 provided with a stacking surface 7 susceptible to receive the continuous strip (or the continuous strips) 4 of dielectric material from the feeding apparatus 3.

Figure 2:
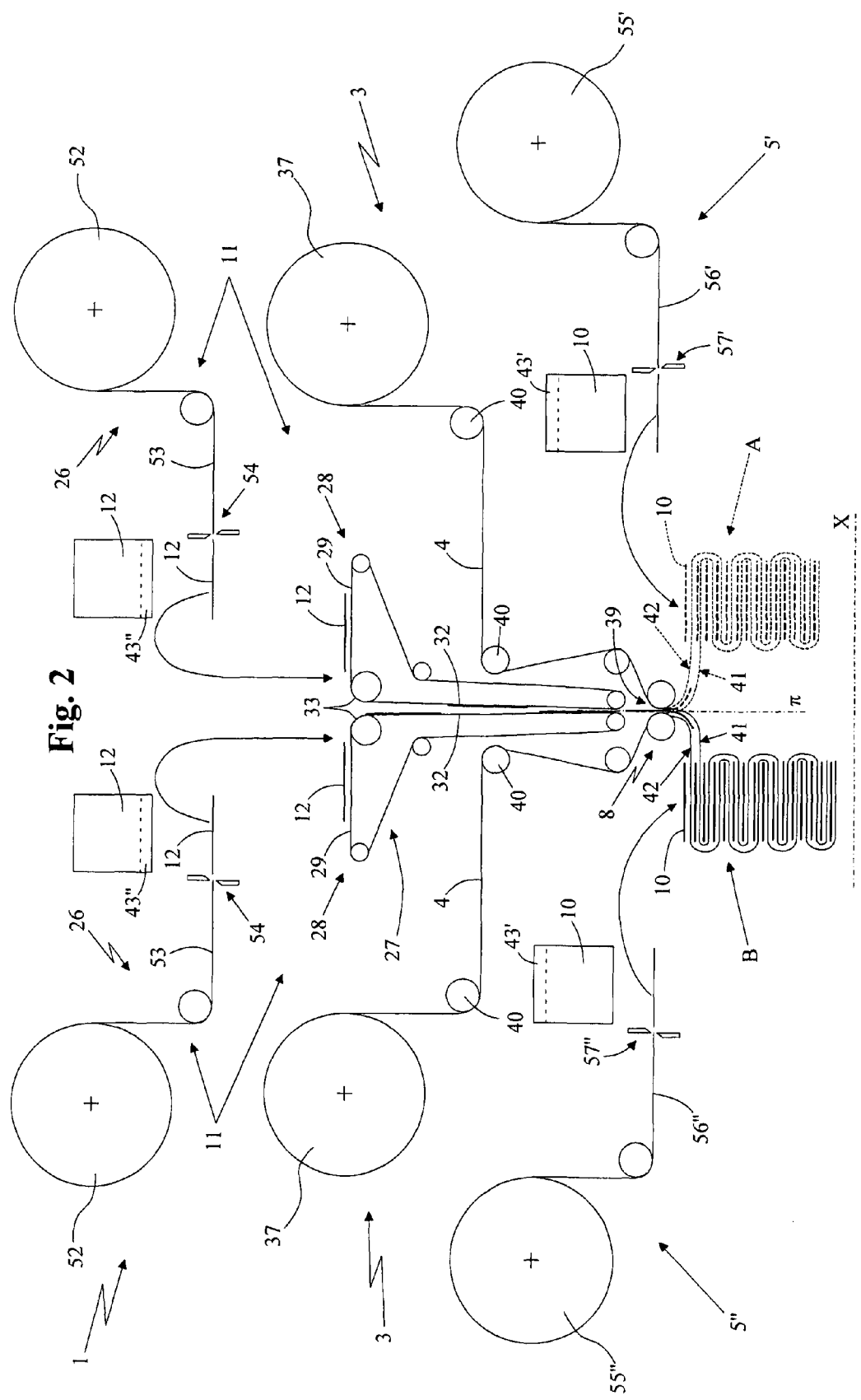
FIG. 2 shows a simplified schematic view of a second embodiment of a machine in accordance with the present invention, with first and second electrodes as drawn from provided reels illustrated in plan view.
Figure 11:
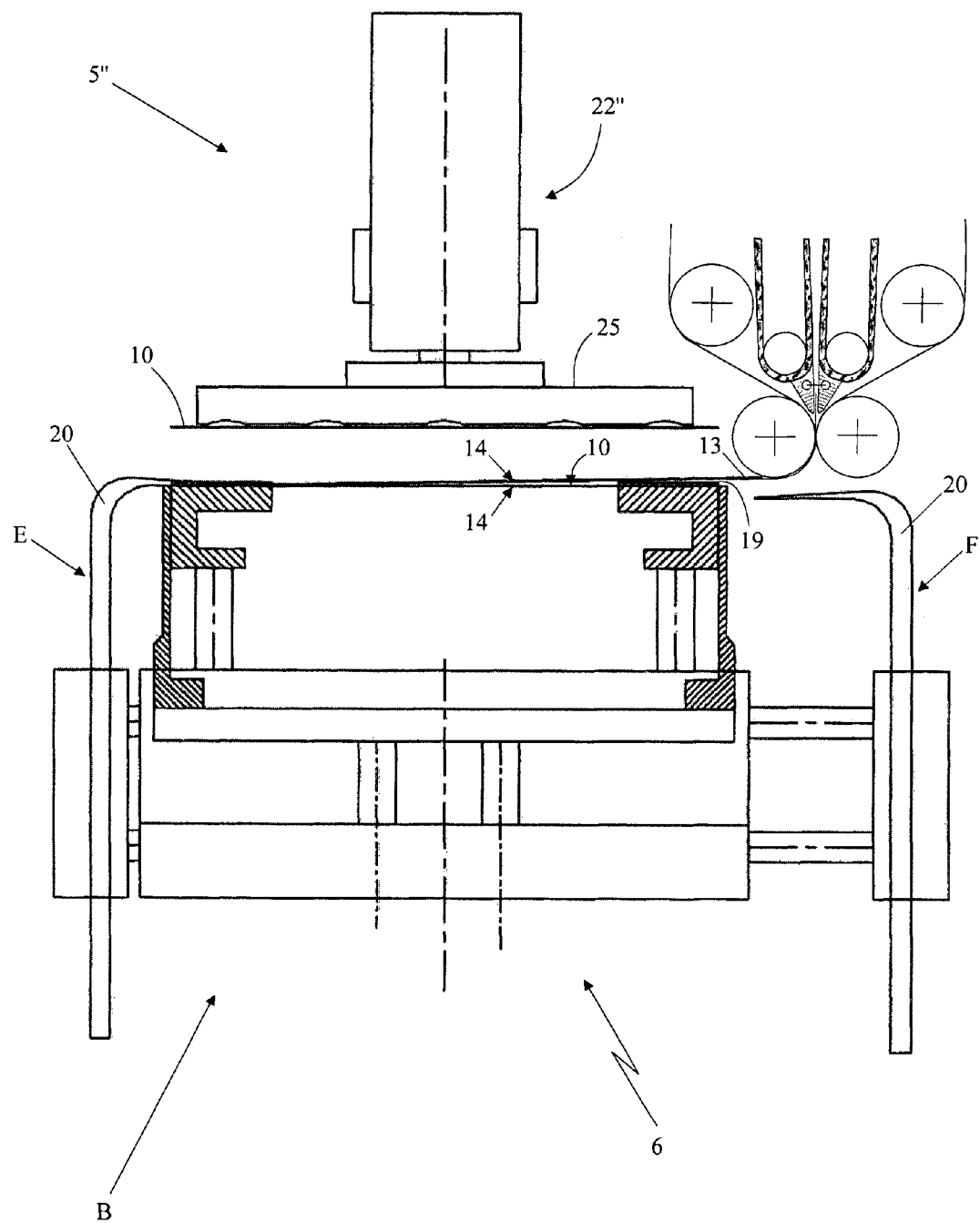
FIG. 11 shows the folding head of FIG. 3 in a frontal view during a step for depositing a first electrode on the stack of electrodes and separators being formed.
Figure 12:
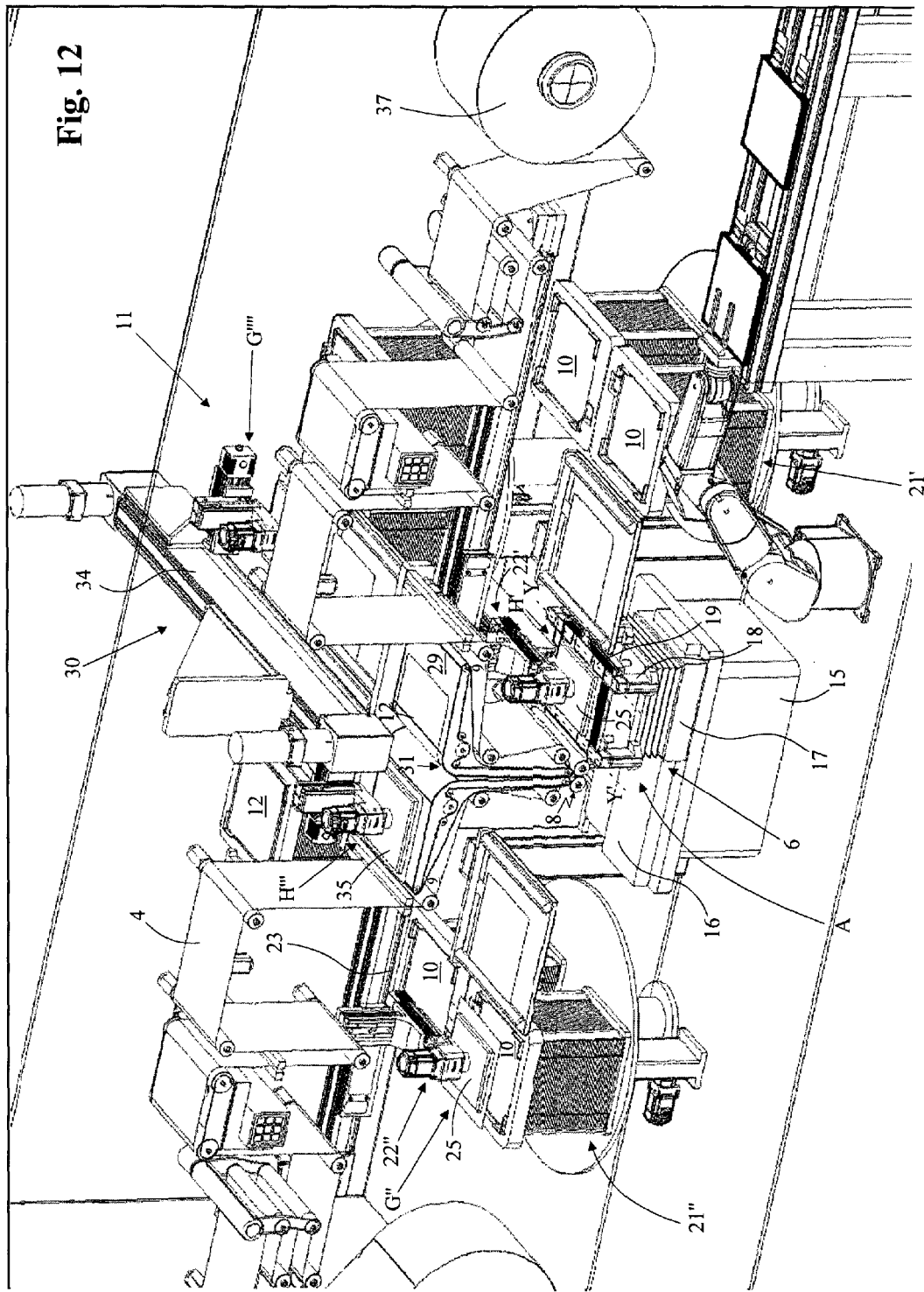
FIG. 12 shows a top perspective view of a portion of the machine in accordance with the present invention.
Figure 13:
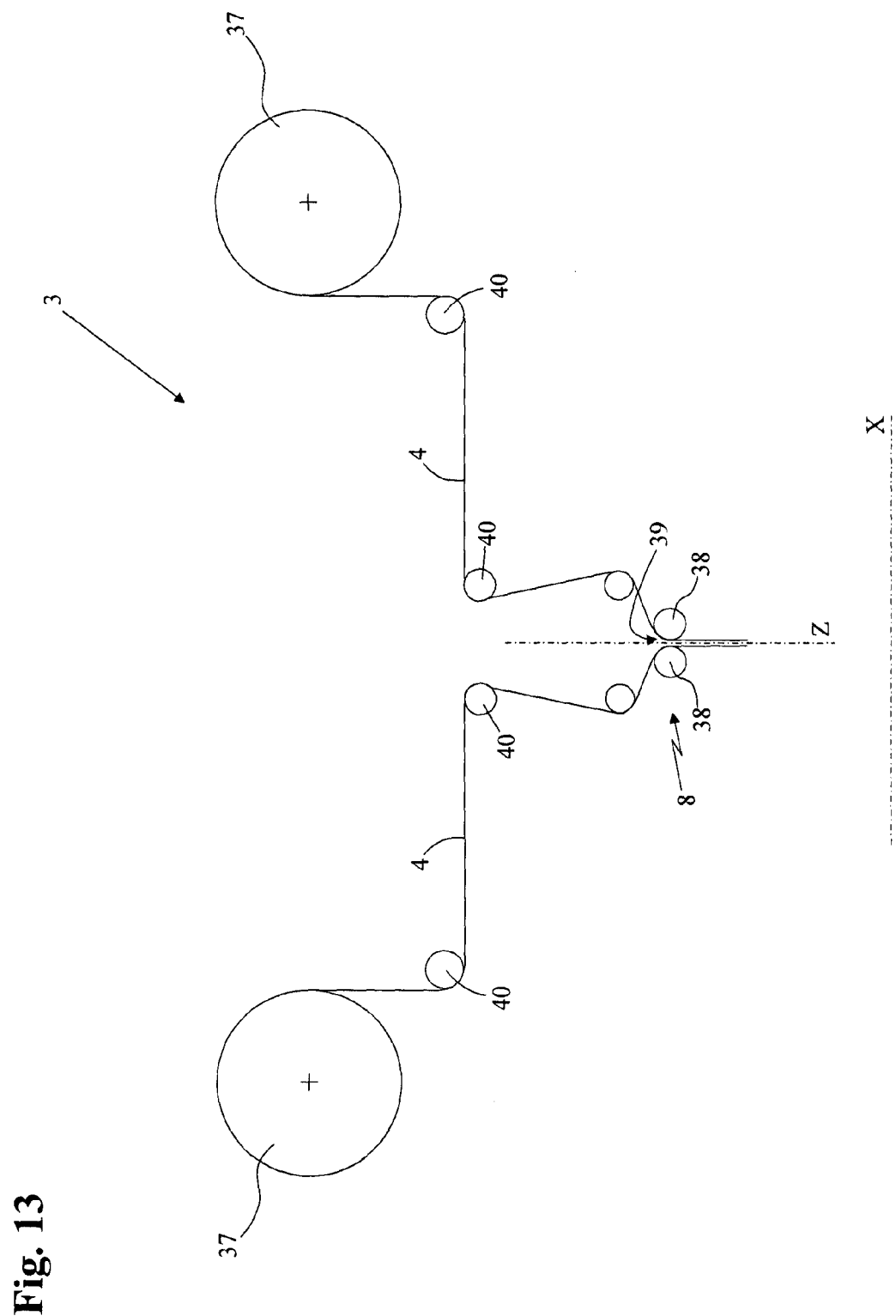
FIG. 13 shows a simplified schematic view of the machine according to the present invention, relative to a provided feeding apparatus.

The folding head 6 is movable between a first position A, illustrated for example in FIGS. 1, 2, 7, 8 and 12, and a second position B, illustrated for example in FIGS. 1, 2 and 11, translated with respect to the first position A along a direction X orthogonal to the lying plane π of the continuous strip (or of the continuous strips) 4 of dielectric material released from the feeding apparatus 3 in order to obtain, by being moved from the position A to the position B and vice versa, a plurality of layers with the electrodes interposed that were deposited by the first and by the second distribution apparatus 5' and 5".

In accordance with the idea underlying the present invention, the feeding apparatus 3 is adapted to release, on the folding head 6, two continuous strips 4 of dielectric material and comprises coupling means 8 for coupling the two continuous strips 4 in their extension, along respective opposite internal faces 9 thereof.

In addition, the first distribution apparatus 5' and the second distribution apparatus 5" are adapted to distribute first electrodes 10 having the same polarity.

Still in accordance with the idea underlying the present invention, the machine 1 comprises a third distribution apparatus 11 of second electrodes 12 having opposite polarity with respect to the polarity of the first electrodes 10, such third distribution apparatus 11 adapted to transfer the second electrodes 12 to the coupling means 8 of the feeding apparatus 3, introducing them between the internal faces 9 of the two continuous strips 4 of dielectric material. The second electrodes 12 are transferred to the coupling means 8 by the third distribution apparatus 11 spaced from each other, so as to be spaced from each other along the preferred extension direction Z of the two continuous strips 4. The feeding apparatus 3 is then adapted to release, towards the folding head 6, the pair of continuous strips 4 with the second electrodes 12 spaced from each other interposed. More in detail, the pair of continuous strips 4 is released towards the folding head 6 by the coupling means 8 of the feeding apparatus 3, in particular through an emission mouth 59 thereof. In the enclosed figures, the pair of continuous strips 4 with the second electrodes 12 interposed is indicated with the number 13 in its entirety.

To facilitate the description, when the pair 13 of continuous strips 4 is referred to hereinbelow, it is intended to indicated the set formed by the two continuous strips 4 bearing, interposed between the internal faces 9 thereof, the second electrodes 12 that are spaced from each other.

The folding head 6 is adapted to receive, from the feeding apparatus 3, a composite layer 14 formed by a section of the pair 13 of continuous strips 4 containing one of the second electrodes 12, interposed between the two continuous strips 4, with each passage between the first and the second position A and B, i.e. each time it moves from the first position A to the second position B and vice versa, forming a fold 45 between two consecutive composite layers 14.

Figure 8:
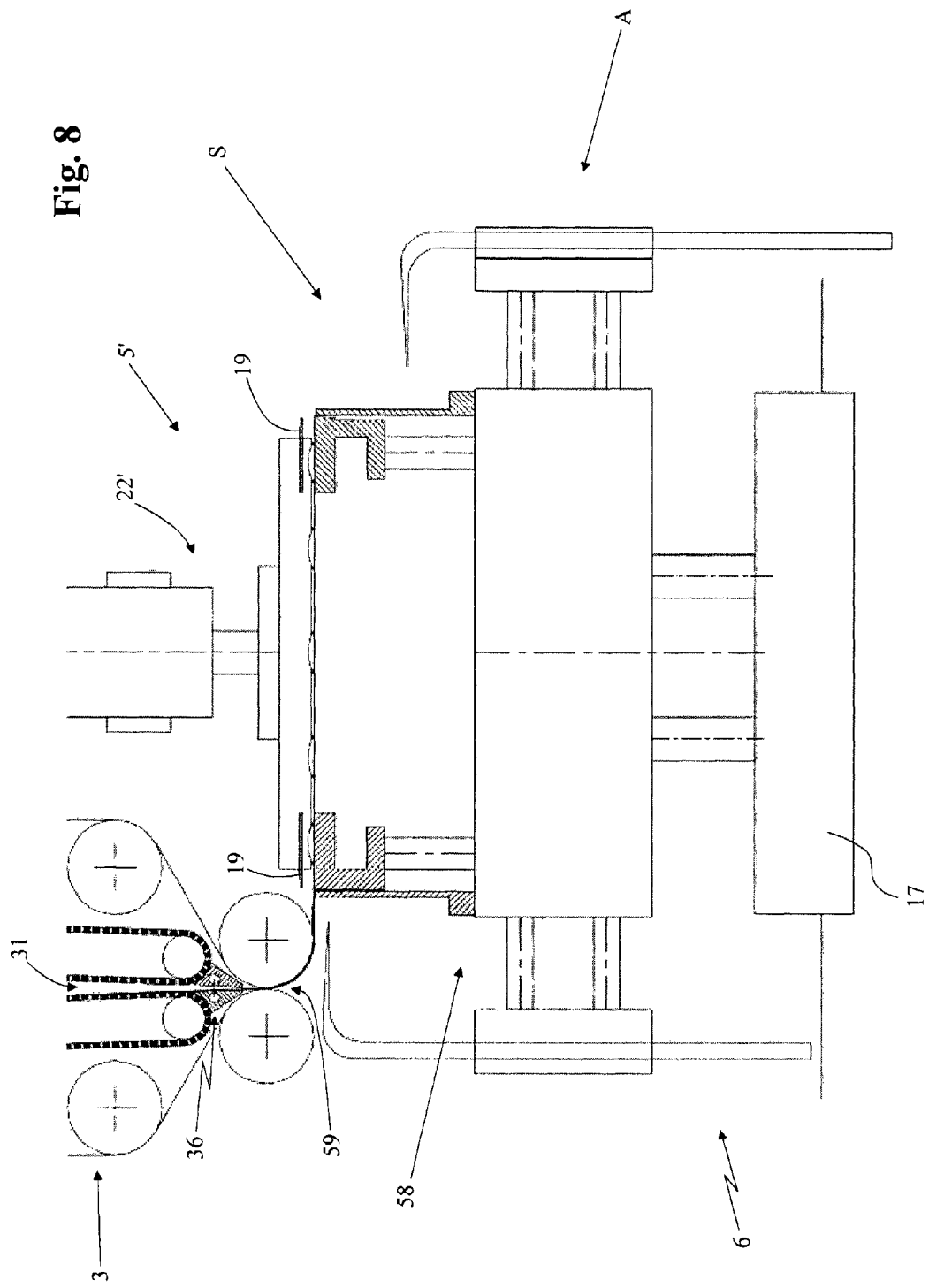
FIG. 8 shows the folding head of FIG. 3 in a frontal view during a step of depositing a first electrode on the folding head.

In addition, the folding head 6 is adapted to receive a first electrode 10 from the first distribution apparatus 5', when it is situated in the first position A, on the composite layer 14 received from the feeding apparatus 3 being moved from the second position B to the first position A, as illustrated in FIG. 8, and it is adapted to receive a first electrode 10 from the second distribution apparatus 5", when it is situated in the second position B, on the composite layer 14 received from the feeding apparatus 3 being moved from the first position A to the second position B, as illustrated in FIG. 11, in order to form a stack on the stacking surface 7 composed of the composite layers 14 alternated with the first electrodes 10.

Figure 14D:
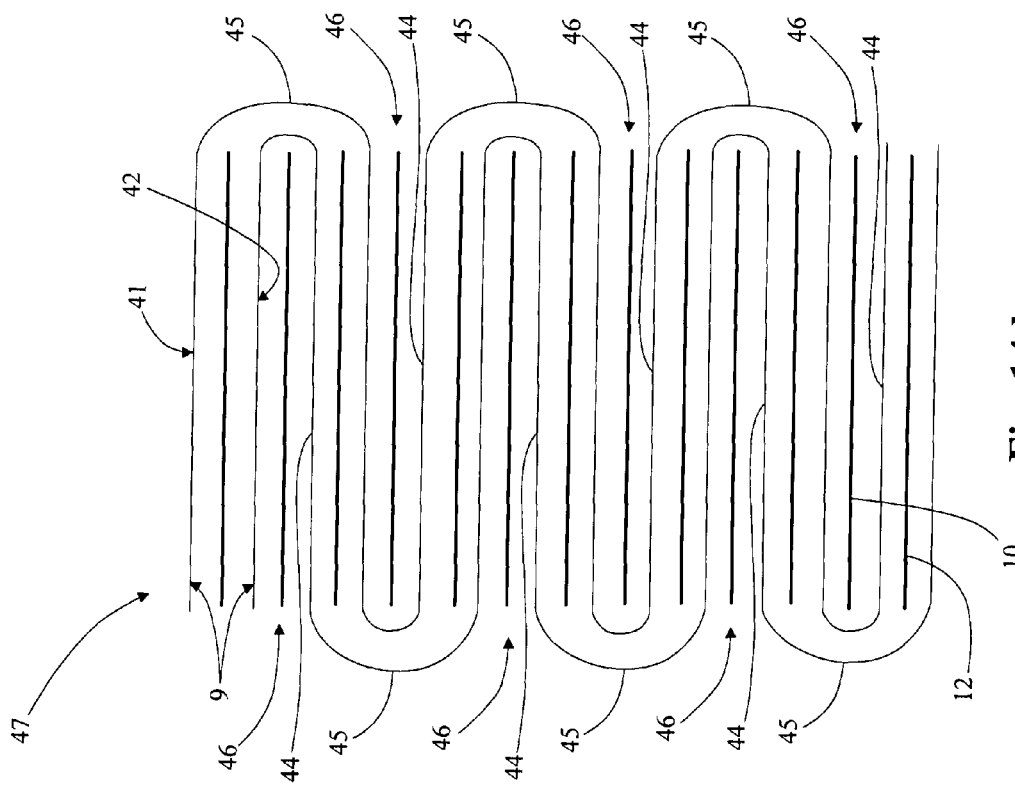
FIG. 14d shows a schematic side view of a cell for storage battery according to the present invention in the stacked configuration.

Due to the movement of the folding head 6 between the first and the second position A and B, the pair 13 of continuous strips 4 with the second electrodes 12 interposed that is released by the coupling means 8 is arranged on the stacking surface 7 in a plurality of composite layers 14, each formed by a section of the pair 13 of strips containing a second electrode 12, substantially folded as a zigzag on each other and with the first electrodes 10 interposed. The machine 1 according to the present invention is thus adapted to form on the folding head 6, and in particular on the stacking surface 7 thereof, a stack of first electrodes 10 and second electrodes 12 alternated with each other, with the two continuous strips 4 of dielectric material, comprising the second electrodes 12 between them, each alternately defining two consecutive separators 24, as is clearly visible in FIG. 14d.

Preferably, the lying plane π of the pair 13 of continuous strips 4 released by the coupling means 8 is substantially vertical and the folding head 6 is arranged below the coupling means 8 in order to receive therefrom the pair 13 of continuous strips 4 on its substantially horizontal stacking surface 7. The first and the second position A and B, between which the folding head 6 is movable, are advantageously arranged symmetric to the lying plane π of the pair 13 of continuous strips 4 released by the coupling means 8, as illustrated in FIGS. 1 and 2.

The folding head 6 is intended to receive, from the coupling means 8, the first of the composite layers 14 directly on the stacking surface 7, whereas it is intended to receive the subsequent composite layers 14 on the stack of electrodes and separators being formed on the stacking surface 7 thereof, i.e. particularly on the last of the first electrodes 10 that was deposited on the stack being formed by the first or by the second distribution apparatus 5' or 5".

In accordance with a preferred embodiment of the machine 1 according to the present invention illustrated in the enclosed figures, the folding head 6 comprises a trolley 17 susceptible to slide, guided by a horizontal guide 16, on a base 15 fixed to the support structure 2, in order to move the folding head 6 between the first position A and the second position B. Advantageously, the trolley 17 is actuated to slide on the guide 16 by actuation means, such as an electric motor (not shown).

Figure 9:
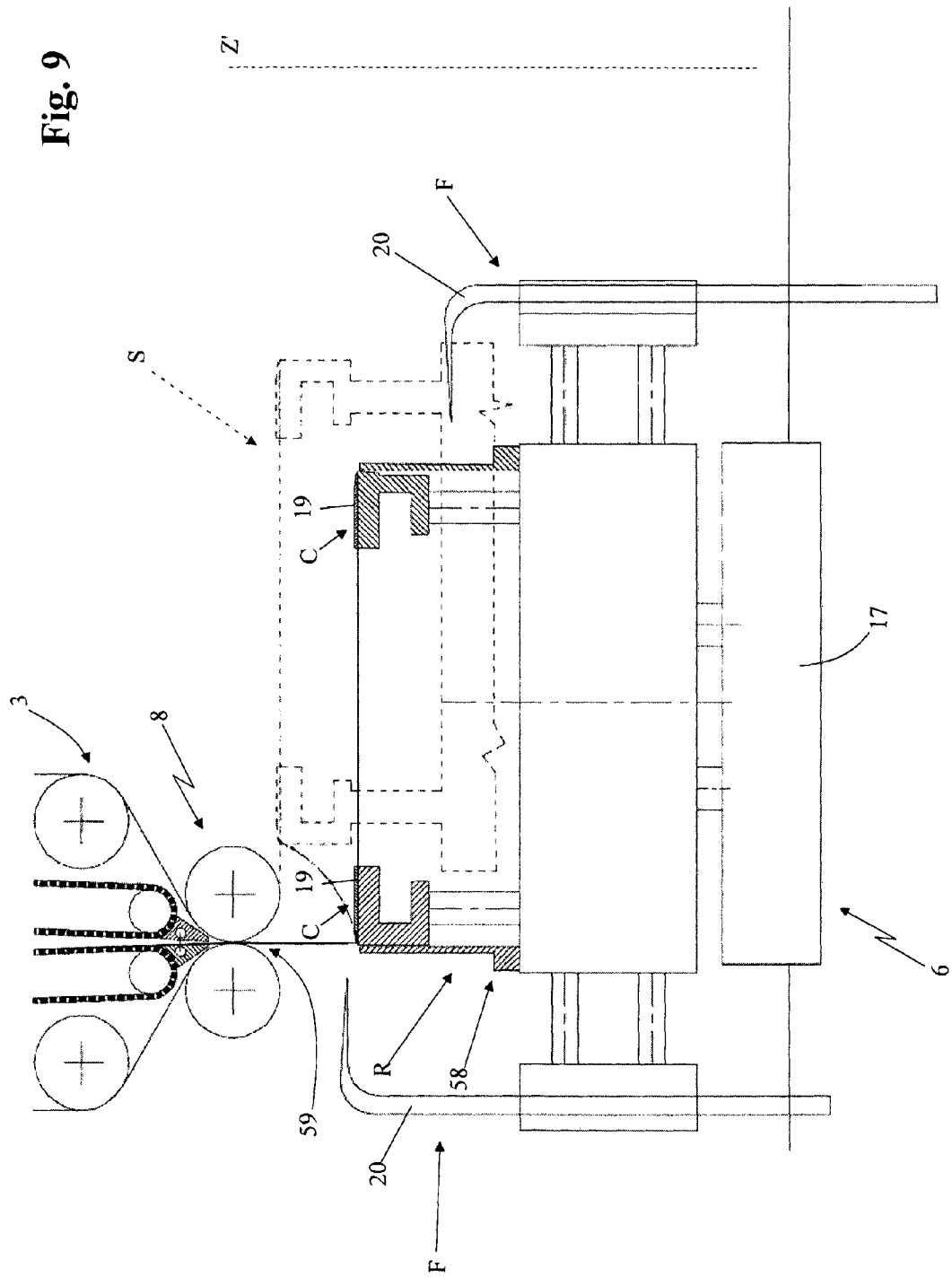
FIG. 9 shows the folding head of FIG. 3 in a front view during a step of forming a first fold on the pair of dielectric material strips intended to form the separators.
Figure 10:
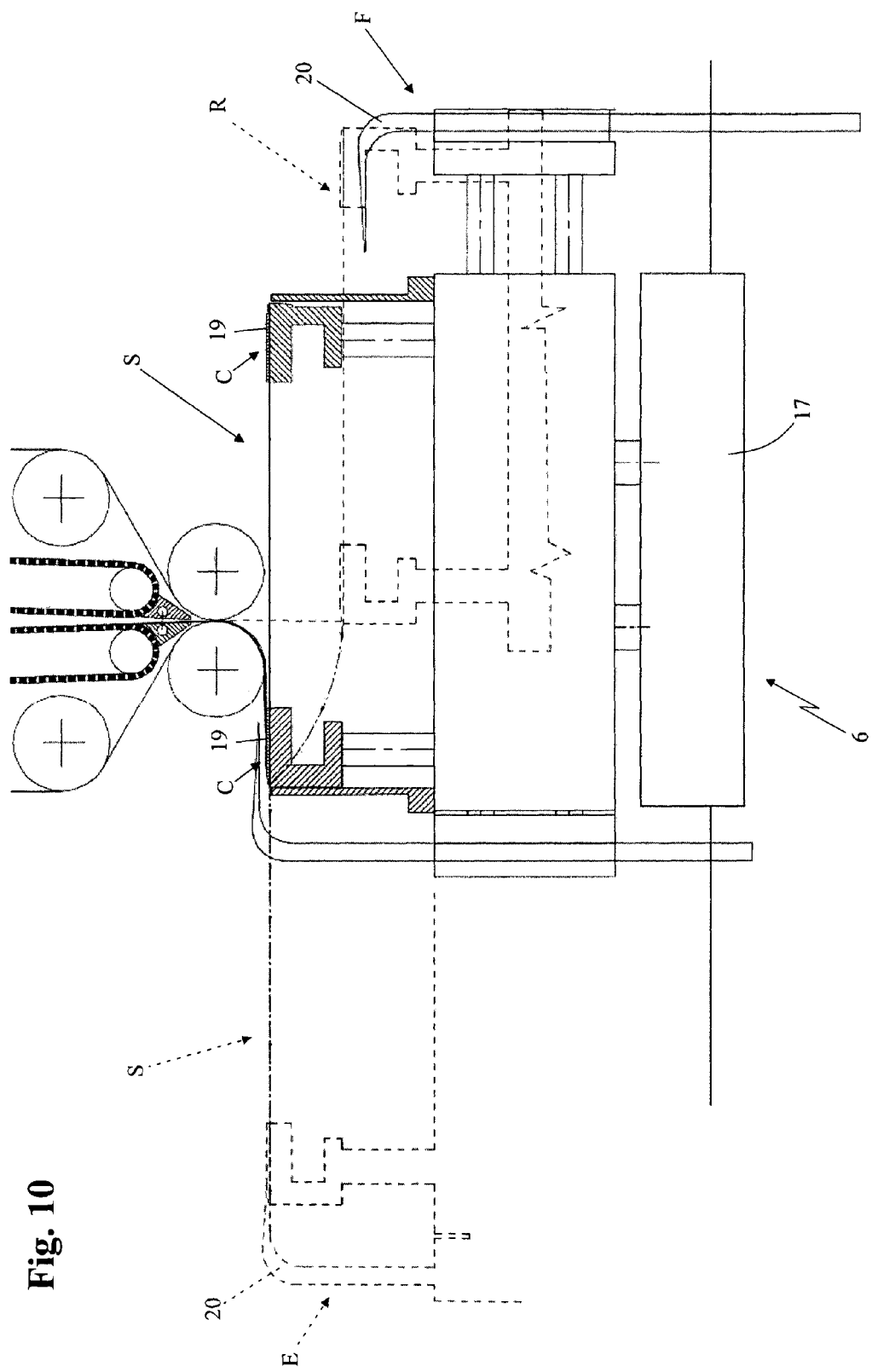
FIG. 10 shows the folding head of FIG. 3 in a front view during a step of depositing a composite layer comprising a pair of separators and an electrode on the stack of electrodes and separators being formed.

The folding head 6 also comprises a stacking portion 58, comprising the stacking surface 7, which is mounted on the trolley 17 movable along a direction Z' parallel to the preferred extension direction Z of the two continuous strips 4 released from the feeding apparatus 3, between a receded position R, illustrated for example in FIG. 9, in which it is moved away from the emission mouth 59 of the coupling means 8, and an advanced position S, illustrated for example in FIGS. 8 and 10, in which it is brought close to the emission mouth 59 of the coupling means 8, along the direction Z'. The stacking portion 58 is arranged in the receded position R for at least one section of the travel of the trolley 17 between the first position A and the second position B, in order to maintain powered the pair 13 of continuous strips released by the coupling means 8 through the emission mouth 59, as will be better explained hereinbelow.

The stacking portion 58 of the folding head 6 comprises two or more support columns 18 on which the stacking surface 7 is slidably mounted. More in detail, the stacking surface 7 is susceptible to be actuated to be lowered with respect to the support columns 18 in order to house, inside a volume delimited by the columns 18, the stack of electrodes and separators being formed on the stacking surface 7, as is for example visible in the enclosed FIG. 3. Preferably, the stacking surface 7 is susceptible to being actuated to be progressively lowered with respect to the support columns 18 as the height of the stack being formed increases, in order to prevent the stack itself from interfering with the coupling means 8 when the head 6 is moved between the first and the second position A and B. In addition, the stacking surface 7 is susceptible to being actuated to be lifted with respect to the support columns 18 when the stack of electrodes and separators formed thereon has terminated and it is then drawn by the folding head 6, e.g. by means of an arm of a robot 48, as illustrated in FIG. 4.

Advantageously, the stacking surface 7 is controlled to be moved with respect to the columns 18 by means of actuation means (not shown), such as an electric motor.

The folding head 6 also comprises two more folding blades 19, and preferably four folding blades 19, which are advantageously mounted on the stacking portion 58, preferably on two opposite sides thereof, and are extended parallel to the stacking surface 7 and orthogonal to the translation direction X of the folding head 6 between the first and the second position A and B. More in detail, a first pair of folding blades 19 mounted on two opposite sides of the stacking portion 58 is extended along a first preferred direction Y and a second pair of folding blades 19, also mounted on two opposite sides of the stacking portion 58, is extended along a second preferred direction Y', parallel to the first preferred direction Y.

The pair of folding blades 19 are advantageously movable independent from each other and can be vertically translated along the preferred extension directions Y and Y' thereof between an interference position C and one or more non-interference positions D. In particular, in the interference position C the folding blades 19 are superimposed on the stacking surface 7 and retain the stack of electrodes and separators being formed thereon when the folding head 6 is moved between the first position A and the second position B, preventing the composite layers 14 and the first electrodes 10 deposited on the folding head 6 from being moved. The front pair of folding blades 19, front with respect to the advancing direction of the folding head 6, is also placed in the interference position C when the head 6 is moved between the first position A and the second position B, in order to facilitate the formation of a fold on the pair 13 of continuous strips 4 that the coupling means 8 are releasing on the folding head 6, as illustrated in the enclosed FIGS. 9 and 10.

The folding blades 19 therefore allow simply and precisely obtaining a fold on the two continuous strips 4 of dielectric material and they also perform an action of mechanical blocking of the stack of electrodes and separators being formed, preventing the latter from being misaligned, in particular during the movement of the folding head 6.

In the non-interference positions D, the blades 19 are moved away from the stacking surface 7, i.e. from the stack of electrodes and separators being formed thereon. Advantageously, the folding head 6 can also comprise two locking clamps 20, mounted on the stacking portion 58, preferably on the two opposite sides of the latter that do not carry the folding blades 19 mounted, such clamps adapted to assist the folding blades 19 in retaining the stack of electrodes and separators being formed on the folding head 6. In particular, the locking clamps 20 can be moved independently from each other and with respect to the folding blades 19, being adapted to translate vertically and along directions parallel to the translation direction X of the folding head 6, between an engagement position E and one or more non-engagement positions F. In the engagement position E, the locking clamps 20 are superimposed on the stacking surface 7 in abutment against the stack of electrodes and separators being formed thereon in order to retain the latter, and particularly for retaining in position the second electrode 12 comprised between the pair 13 of continuous strips 4 that the coupling means 8 are releasing on the folding head 6, as illustrated in FIG. 11. For such purpose, only the front locking clamp 20, front with respect to the advancing direction of the folding head 6, is advantageously brought in the engagement position E, preferably when the folding head 6 is situated about halfway between the position A and the position B. In the non-engagement positions F, the locking clamps 20 are moved away from the stacking surface 7, i.e. from the stack of electrodes and separators being formed thereon.

Advantageously, the stacking portion 58 is actuated to be moved from the advanced position S to the receded position R along an initial section of the travel of the trolley 17 from the first position A to the second position B or vice versa, with the pair of front folding blades 19, front with respect to the advancing direction of the folding head 6 arranged in the interference position C, until such pair of front folding blades 19 substantially reaches the emission mouth 59 of the coupling means 8, i.e. it is substantially arranged below the latter. Subsequently, the stacking portion 58 is actuated to be newly moved towards the advanced position S and it then remains in the latter position until the trolley 17 has reached the second position B (or the first position A).

In such a manner, the portion of the pair 13 of continuous strips 4 released by the coupling means 8, retained by the pair of front folding blades 19 and not yet deposited on the folding head 6 is maintained taught, such that the formation of the fold is facilitated.

In accordance with a first embodiment of the machine 1 according to the present invention, the first and the second distribution apparatus 5' and 5" respectively comprise a first storage area 21' and a second storage area 21", which are mounted on the support structure 2 on the sides of the folding head 6. The first and the second distribution apparatus 5' and 5" also respectively comprise a first and a second transport device 22' and 22", adapted to draw the first electrodes 10 respectively from the first storage area 21' and from the second storage area 21" and to transfer them to the folding head 6.

Advantageously, the first and the second storage area 21' and 21" are adapted to contain the first electrodes 10 stacked on each other, with the transport collectors for the current 43' arranged on the same side in both storage areas, as illustrated in FIG. 1, such that all the first electrodes 10, drawn from the first storage area 21' or from the second storage area 21" and released on the folding head 6, i.e. on the stack of electrodes and separators being formed thereon, are arranged with the current transport collectors 43' aligned and arranged on the same side of the stack.

Preferably each of the transport devices 22' and 22" is movable along a first horizontal guide 23 between a first (or second) draw position G' (or G"), in which it is arranged above the corresponding first (or second) storage area 21' (or 21") and collects therefrom a first electrode 10, and a first (or second) transfer position H' (or H"), in which it is arranged above the folding head 6 and transfers thereto the first electrode 10 previously collected from the storage area. The first and the second transport device 22' and 22" comprise first gripping means 25, such as a sucker or an aspirated plate, for selectively attracting thereto and retaining or releasing the first electrodes 10 when they are found in the first (or second) draw position G' (or G") and in the first (or second) transfer position H' (or H").

Advantageously, when the first transport device 22' is situated in the first draw position G', the second transport device 22" is situated in the second transfer position H", and vice versa, such that the head 6 can be quickly moved between the first and the second position A and B in order to receive the first electrodes 10 alternately from the first and from the second transport device 22' and 22".

In accordance with a second embodiment of the machine 1 according to the present invention, the first and the second distribution apparatus 5' and 5" respectively comprise a first reel 55' and a second reel 55", as illustrated in FIG. 2, each susceptible to support a winding respectively of a first continuous strip 56' and of a second continuous strip 56" of substrate material for electrodes.

The first and the second continuous strip 56' and 56" are partially coated with an active coating for the formation of the first electrodes 10. More in detail, the active coating is coated in a continuous manner along the extension of the first and second continuous strip 56' and 56" of substrate material for electrodes, on a lateral portion of each of the latter. The portions of the first and of the second continuous strip 56' and 56" lacking the active coating are adapted to define the current transport collectors 43' of the first electrodes 10, as is visible in the representation in plan view of the first electrodes 10, reported in FIG. 2.

The first and the second distribution apparatus 5' and 5" also respectively comprise a first cutting device 57' and a second cutting device 57", susceptible to cut respectively the first and the second continuous strip 56' and 56" of substrate material for electrodes, partially coated with the active coating, in order to separate portions of the first and second continuous strip 56' and 56", each adapted to define the first electrodes 10. The first and the second distribution apparatus 5' and 5" in accordance with the final embodiment also respectively comprise a first transport device and a second transport device (not shown), susceptible to draw the first electrodes 10, respectively separated from the first and from the second continuous strip 56' and 56" of substrate material for electrodes and to release them on the folding head 6, when the latter is respectively situated in the first position A and in the second position B.

Advantageously, the first and the second reel 55' and 55" are adapted to support the winding respectively of the first continuous strip 56' and of the second continuous strip 56" of substrate material for electrodes with the portions of the latter lacking the active coating arranged mirrored, such that all the first electrodes 10, separated from the continuous strips 56' and 56" and released on the folding head 6, i.e. on the stack of electrodes and separators being formed thereon, are arranged with the current transport collectors 43' arranged on a same side of the stack.

The first and the second transport device of the first and second distribution apparatus 5' and 5" in accordance with the latter embodiment of the machine 1 in particular can be substantially of the type described previously.

The third distribution apparatus 11 of the second electrodes 12 of the machine 1 in accordance with the present invention advantageously comprises means 26 for supplying the second electrodes 12 in succession and a device 27 for transferring the second electrodes 12, adapted to receive the second electrodes 12 from the supply means 26 and to transfer them, one after the other and equidistant from each other, to the coupling means 8 of the feeding apparatus 3, in order to insert them between the internal faces 9 of the two continuous strips 4 of dielectric material.

Preferably, the supply means 26 are adapted to transfer, to the transfer device 27, the second electrodes 12 in sheet form and the transfer device 27 comprises two first conveyor belts 28, each provided with a support portion 29 adapted to receive one of the second electrodes 12 in sheet form from the supply means 26, as will be better explained hereinbelow.

In accordance with a first embodiment of the machine 1 according to the present invention schematized in FIG. 1, the supply means 26 comprise one or more third storage areas 51, and preferably two third storage areas 51, for the containment of the second electrodes 12 in precut sheet form. Advantageously, the two third storage areas 51 are adapted to contain the second electrodes 12 stacked on each other, with the current transport collector 43" arranged on the same side in both the storage areas 51, as illustrated in FIG. 1, such that the second electrodes 12 inserted between the two continuous strips 4 of dielectric material, as better specified below, are arranged with the current transport collectors 43" projecting all from a same side of the pair 13 of continuous strips 4. In addition, each pair of adjacent second electrodes 12 along the extension of the continuous strips 4 is arranged with the electrical collectors 43" arranged mirrored, as illustrated in FIG. 14a.

The third distribution apparatus 11 also comprises one or more third transport devices 30, and preferably two third transport devices 30, each adapted to draw the second electrodes 12 from a corresponding third storage area 51 and to transfer them to the transfer device 27.

Preferably each of the third transport devices 30 is movable between a third (or fourth) draw position G'" (or G""), in which it is arranged above the corresponding third storage area 51 and collects therefrom a second electrode 12, and a third (or fourth) transfer position H'" (or H""), in which it is arranged above the support portion 29 of a corresponding conveyor belt 28 and transfers to the latter the second electrode 12 previously collected from the storage area. Advantageously, when one of the third transport devices 30 is situated in the third (or fourth) draw position G'" (or G'"), the other third transport device 30 is situated in the third (or fourth) transfer position H'" (or H"") and vice versa, in order to quickly transfer the second electrodes 12 to the transfer device 27. Advantageously each of the third transport devices 30 is movable between the third (or fourth) draw position G'" (or G"") and the third (or fourth) transfer position H'" (or H"") along a second horizontal guide 34, arranged substantially orthogonal to the first horizontal guide 23 of the first and second transport device 22' and 22", The third transport devices 30 each comprise second gripping means 35, such as a sucker or aspirated plate, for selectively attracting thereto and retaining or releasing the second electrodes 12 when they are situated respectively in the third (or fourth) draw position G'" (or G"") and in the third (or fourth) transfer position H'" (or H"").

In accordance with a second embodiment of the machine 1 according to the present invention schematized in FIG. 2, the supply means 26 are adapted to transfer, to the transfer device 27, the second electrodes 12 in sheet form and they comprise one or more third reels 52 (preferably two third reels 52) each susceptible to support a winding of a continuous strip 53 of substrate material for electrodes, partially coated with an active coating for the formation of the second electrodes 12. More in detail, the active coating is deposited in a continuous manner along the extension of the third continuous strip 53 of substrate material for electrodes, on a lateral portion thereof. The portion of the third continuous strip 53 lacking the active coating is adapted to define the current transport collectors 43" of the second electrodes 12, as is visible in the plan view of the second electrodes. 12 reported in FIG. 2.

The supply means 26 also comprise one or more third cutting devices 54, each susceptible to cut the continuous strip 53 of substrate material for electrodes of a respective third reel 52 for separating portions of the continuous strip 53 of substrate material for electrodes defining the second electrodes 12. The supply means 26 also comprise one or more third transport devices, susceptible to draw the second electrodes 12, separated from the continuous strip 53 of substrate material for electrodes from the third cutting device 54, and to release them to the transfer device.

Advantageously, the two third reels 52 are adapted to support the winding of the third continuous strip 53 of substrate material for electrodes with the portions of the respective continuous strips 53 lacking the active coating arranged mirrored, such that all the second electrodes 10, separated from the respective continuous strips 53 and released to the transfer device 27 and subsequently to the folding head 6, are deposited with the current transport collectors 43" aligned on a same side of the stack, opposite the side of the stack on which the current transport collectors 43' of the first electrodes 10 are arranged.

The third transport devices of the third distribution apparatus 11 in accordance with the latter embodiment of the machine 1 can be in particular substantially of the previously described type.

As specified above, the transfer device 27 advantageously comprises two first conveyor belts 28, each provided with a support portion 29 adapted to receive one of the second electrodes 12 from a corresponding third transport device 30. The first two conveyor belts 28 are arranged side-by-side and define between them a channel 31 for transferring the second electrodes 12 to the coupling means 8 of the feeding apparatus 3. The two first conveyor belts 28 are adapted to guide both the second electrodes 12 set on the respective support portions 29 towards the channel 31.

The channel 31 for transferring the second electrodes 12 to the coupling means 8 of the feeding apparatus 3 is preferably defined between respective guide portions 32 of the two first conveyor belts 28, which are extended substantially orthogonally from the support portions 29, through respective curved connector portions 33 of the first conveyor belts 28. The presence of such connector portions 33 prevents the second electrodes 12 being conveyed by the first conveyor belts 28 from being brusquely folded and thus from being damaged. In accordance with a preferred embodiment of the transfer device 27 illustrated in the enclosed figures, the support portions 29 of the first conveyor belts 28 are substantially horizontal and the guide portions 32 are extended from the latter in a substantially vertical direction.

Preferably, the channel 31 defined between the guide portions 32 has a decreasing width, being tapered towards the outlet mouth of the second electrodes 12 in the direction of the coupling means 8, as illustrated in FIGS. 1 and 2.

As specified above, if the supply means 26 comprise two third storage areas 51, the second electrodes 12 are identically arranged in both third storage areas 51, with the current transport collectors 43" arranged on the same side, and they are transferred from the third transport devices 30 to the respective support portions 29 of the first conveyor belts 28 in the same position. The second electrodes 12 deposited on two different first conveyor belts 28, when transported through the channel 31, undergo a rotation of substantially 90° in opposite direction from each other, such that the second electrodes 12 transported from one conveyor belt 28 or the other are transferred to the coupling means 8 with the electrical collectors 43" arranged mirrored with respect to each other. This allows stacking the second electrodes 12 on the folding head 6 with the electrical collectors 43" aligned and arranged on a same side of the stack, since the second electrodes 12, when deposited on the folding head 6, together with the corresponding composite layers 14, undergo a rotation of substantially 90° alternately in one direction and in the opposite direction, when the head 6 is moved from the first position A to the second position B and vice versa.

Advantageously, the two first conveyor belts 28 are aspirated in order to maintain the second electrodes 12, set on their support portions 29 and transported through the channel 31, in the position in which they were transferred to the transfer device 27 by the third transport devices 30. More in detail, each of the second electrodes 12 is set on the support portion 29 of one of the two first conveyor belts 28 and is transported along the channel 31 by such first conveyor belt 28, retained on the surface of the latter via aspiration, as illustrated in FIGS. 1 and 2.

In particular, the two first conveyor belts 28 are actuated to be intermittently moved, preferably by two separate electric motors, managed autonomously. The two first conveyor belts 28 are thus preferably movable independent of each other. By means of their intermittent movement, the two first conveyor belts 28 define the distance between the second electrodes 12 which are transported through the channel 31 and transferred to the coupling means 8 of the feeding device 3 and hence the distance between the second electrodes 12 along the continuous strips 4 which are released by the feeding device 3 on the folding head 6. When one of the third transport devices 30 transfers, to the corresponding conveyor belt 28, a second electrode 12, the first conveyor belts 28 are advantageously stopped.

In accordance with a preferred embodiment of the machine 1 according to the present invention, the feeding apparatus 3 comprises two reels 37, each susceptible to support a winding of a respective continuous strip 4 of dielectric material. The coupling means 8 of the feeding apparatus 3 are then susceptible to receive the strips 4 of dielectric material from the reels 37 and the second electrodes 12 from the transfer device 27 of the third distribution apparatus 11 and they are adapted to accompany the two coupled continuous strips 4 with the second electrodes 12 interposed towards the folding head 6.

In particular the coupling means 8 advantageously comprise two or more counter-rotating rollers 38, which define a slit 39 between them for the passage of the two continuous strips 4 of dielectric material with the second electrodes 12 inserted between the internal faces 9 thereof, such slit aligned with the channel 31 defined between the conveyor belts 28, and such rollers are adapted to press the two continuous strips 4 towards each other, in order to firmly retain in position the second electrodes 12 inserted between them.

Functionally, the two continuous strips 4 of dielectric material are unwound from the reels 37, transported towards the coupling means 8, support by a plurality of parallel idle rollers 40 that maintain them taut and aligned, and they are driven by the coupling means 8 towards the folding head 6. The idle rollers 40 are rotatably supported by the support structure 2.

Figure 3:
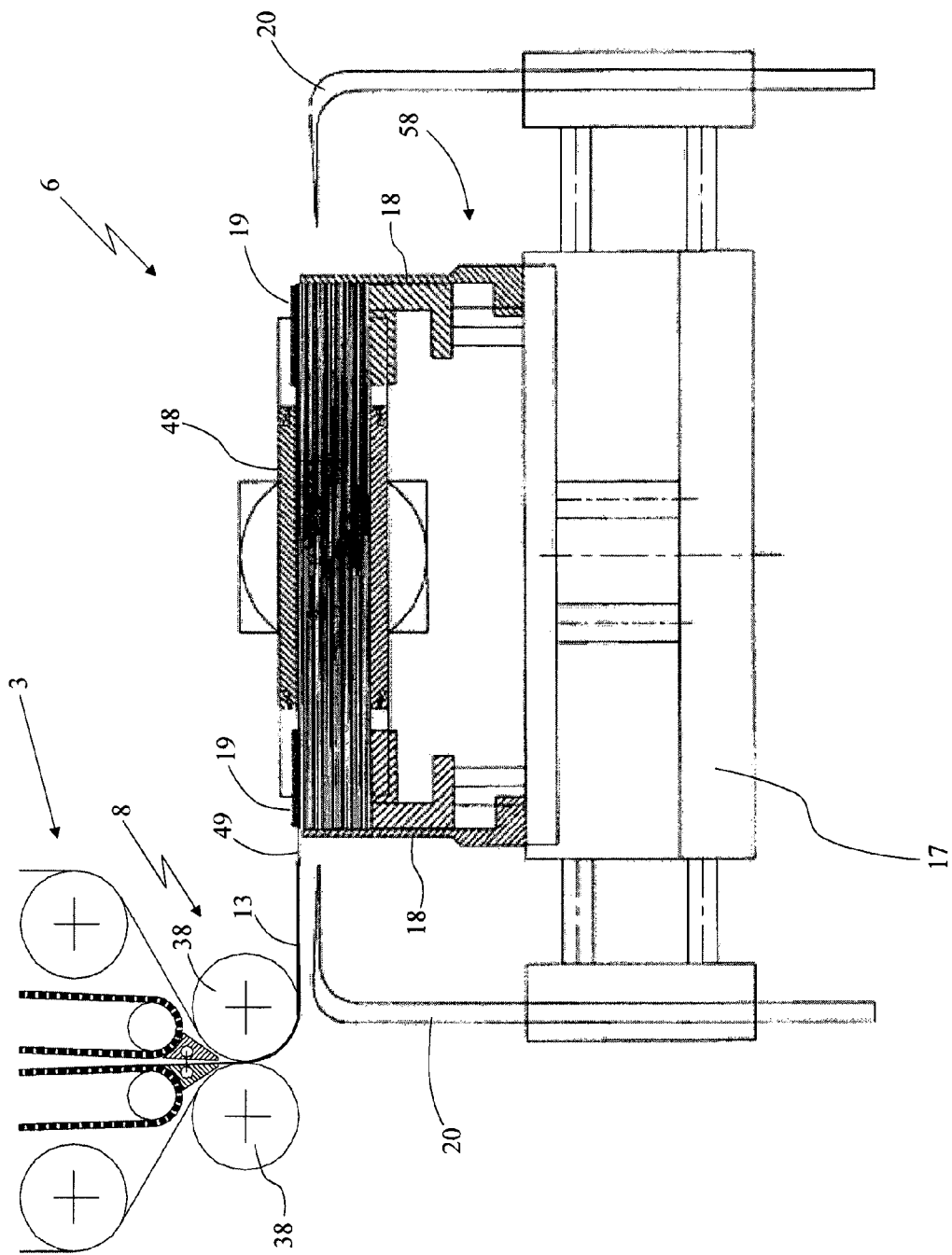
FIG. 3 shows a detail of the machine according to the present invention, relative to a folding head in a frontal view, at the end of the obtainment of a stack of electrodes and separators.
Figure 4:
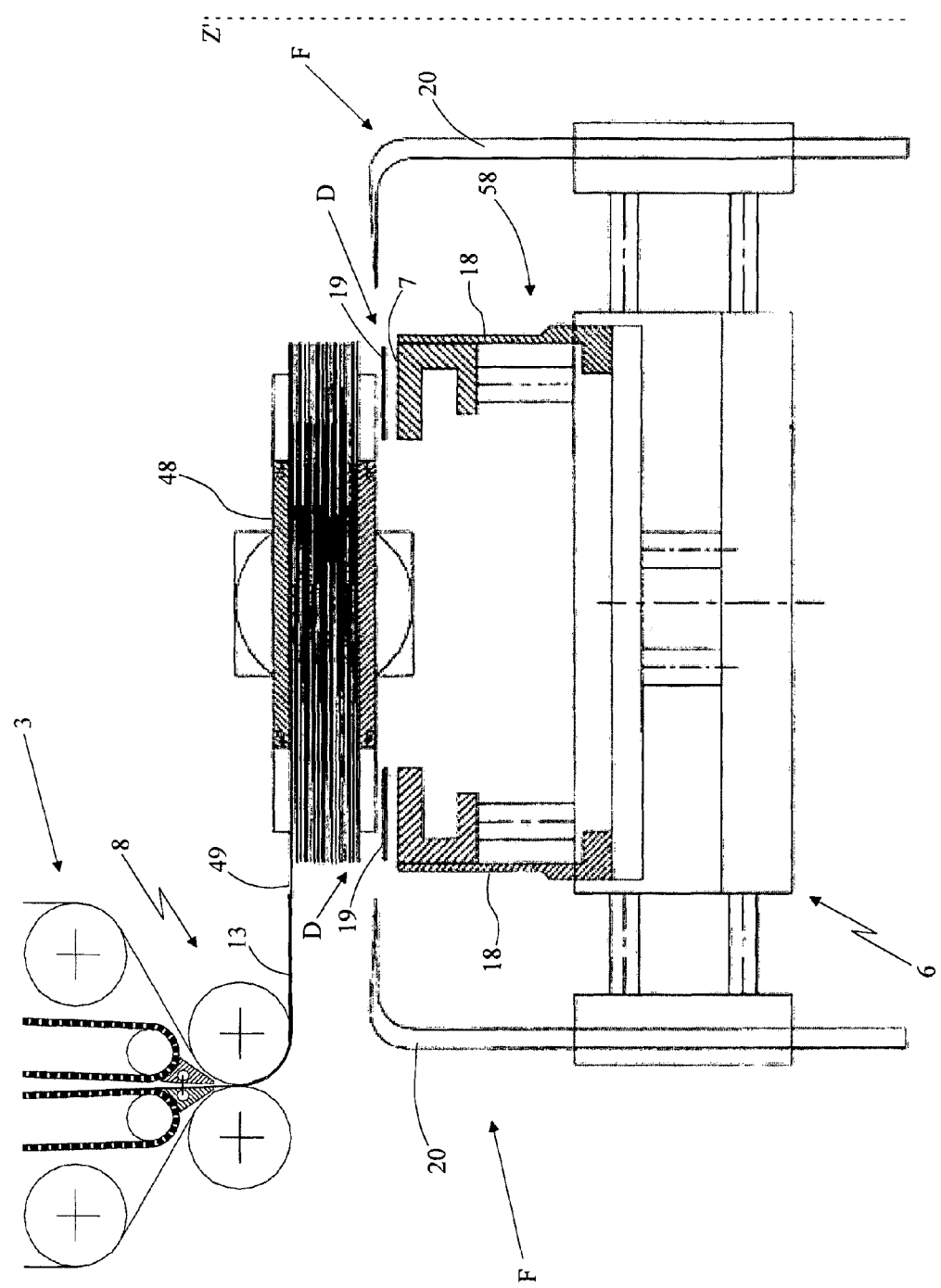
FIG. 4 shows the folding head of FIG. 3 in a frontal view at the end of the lifting of the stack of electrodes and separators already formed by the same folding head.

The transfer device 27 for the second electrodes 12 is placed upstream of the coupling means 8 in order to feed the second electrodes 12 between the internal faces 9 of the two continuous strips 4 of dielectric material entering into the slit 39 defined between the two counter-rotating rollers 38 of the coupling means 8, as is schematically illustrated in FIGS. 2 and 3.

Advantageously the outlet mouth for the second electrodes 12 from the channel 31 defined between the guide portions 32 of the two first aspirated conveyor belts 28 is placed in proximity to the inlet mouth at the slit 39 defined between the two counter-rotating rollers 38, such that the second electrodes 12 are transferred by the first conveyor belts 28 to the coupling means 8 substantially without interruption, minimizing the possibility that they undergo undesired movements. In particular, between the outlet mouth of the channel 31 and the inlet mouth of the slit 39, accompaniment means 36 can be advantageously provided that are adapted to ensure a continuity in the transportation of the second electrodes 12 between the transfer device 27 and the coupling means 8.

Operatively, the two continuous strips 4 of dielectric material are unwound from the respective reels 37 and are guided towards the coupling means 8 of the feeding apparatus 3. Simultaneously, the second electrodes 12 are alternately drawn by a third transport device 30 and by the other from one of the corresponding third storage areas 51, i.e. from one of the corresponding third reels 52, in order to be deposited on the support portion 29 of the corresponding first aspirated conveyor belt 28. The second electrodes 12 are then accompanied through the channel 31 by the guide portions 32 of the advantageously aspirated, conveyor belts 28 and are guided to be inserted, spaced from each other, between the two continuous strips 4 at the entrance to the coupling means 8. In particular, the third distribution apparatus 11 feeds the coupling means 8 with a sequence of second electrodes 12 comprising a pre-established number of second electrodes 12, arranged equidistant from each other. At the end of the aforesaid sequence, a delay in the feeding of the subsequent sequence of second electrodes 12 generates a cutting gap 49 in the two continuous strips 4 which however continue to be drawn from the respective reels 37 and directed towards the folding head 6. Such cutting gap 49 is substantially constituted by a section of the pair of continuous strips 4, within which the second electrodes 12 are not inserted.

The coupling means 8 transport the coupled continuous strips 4 with the second electrodes 12 inserted towards the folding head 6.

In accordance with the operative sequences illustrated in the enclosed FIGS. 3-11, when, on the folding head 6, a stack of electrodes and separators was obtained having the desired size, the latter is drawn, e.g. by means of an arm of a robot 48, and it is transferred to successive work stations.

Figure 5:
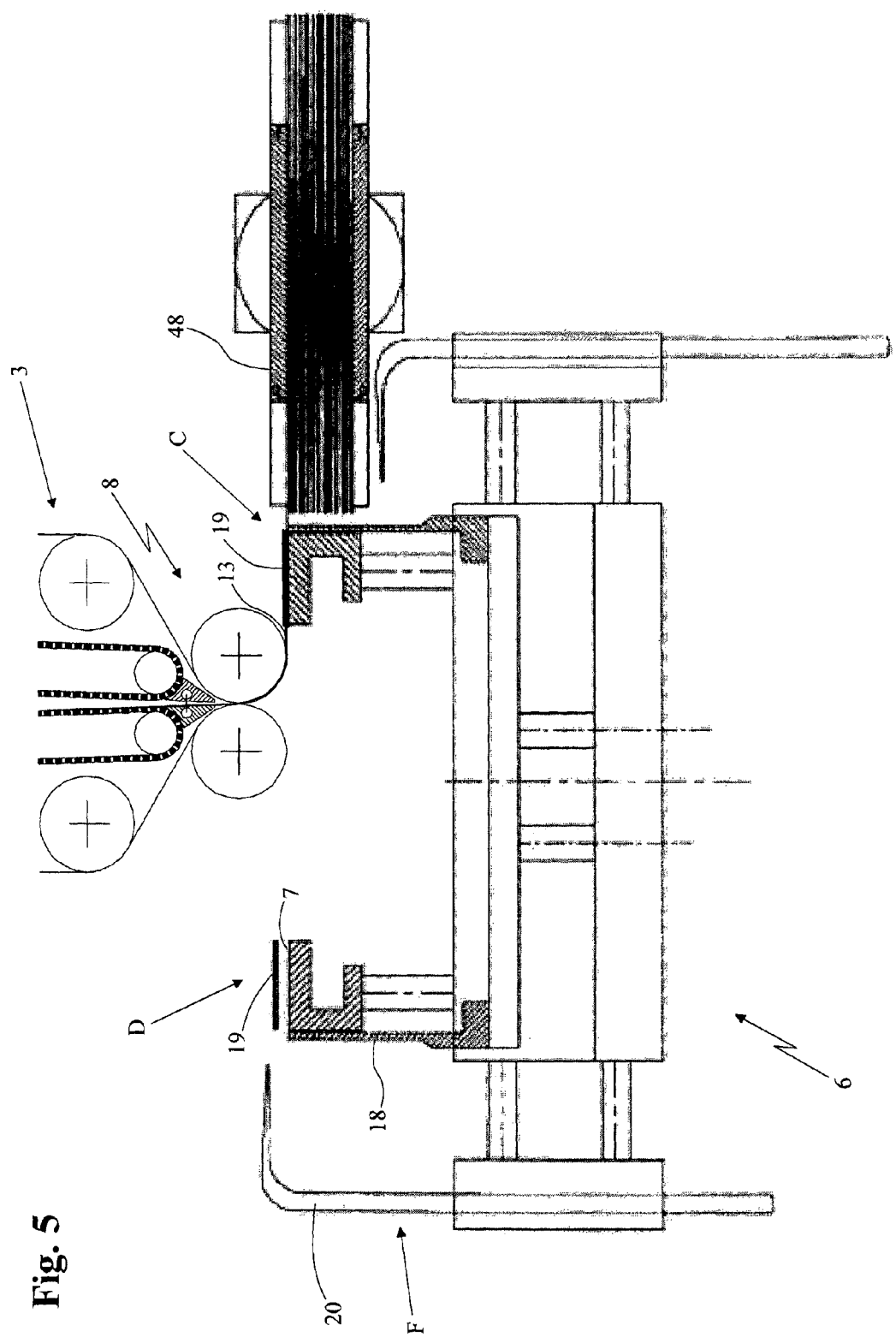
FIG. 5 shows the folding head of FIG. 3 in a frontal view during a step for arranging the cutting of strips of dielectric material that forms the separators of the stack of electrodes and separators already formed.
Figure 6:
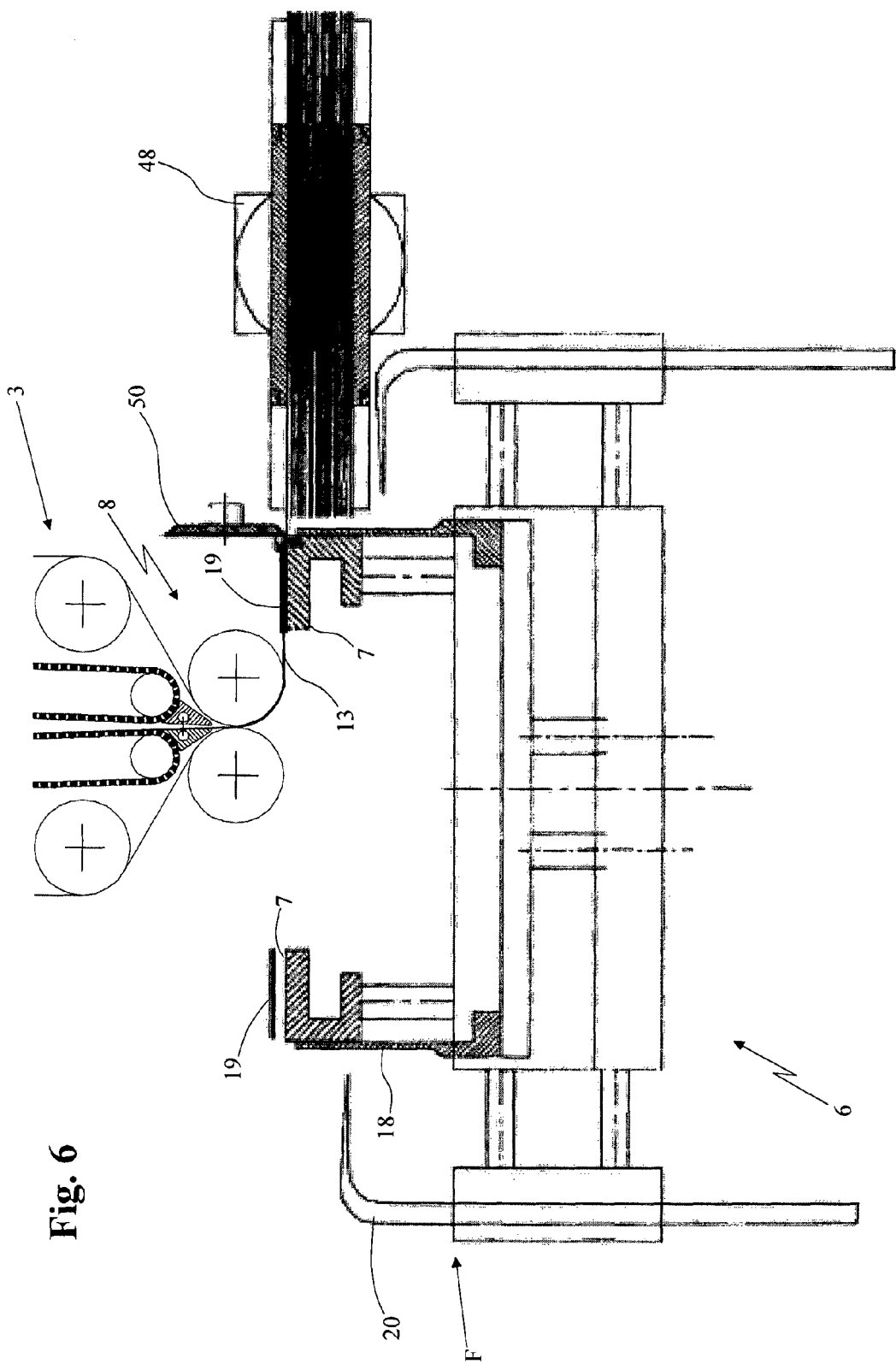
FIG. 6 shows the folding head of FIG. 3 in a frontal view during the step of cutting the pair of dielectric material strips pursuant to FIG. 5.

When the arm of the robot 48 has lifted the stack from the folding head 6, the stacking surface 7 of the latter is actuated to be lifted with respect to the support columns 18 in order to be brought into an initial position (FIG. 4). The folding head 6 is then arranged for a step of cutting the pair 13 of continuous strips 4. For such purpose, the head 6 is translated towards the position B and is stopped below the coupling means 8, as illustrated in FIG. 5. The rear pair of folding blades 19, rear with respect to the advancing direction of the head 6 from the first position A to the second position B, is then brought into the interference position C, in order to retain the pair 13 of continuous strips 4 during the cutting step. The stacking surface 7 is actuated to be lifted with respect to the support columns 18 and is brought into a cutting position, illustrated in FIG. 6. A cutting blade 50, preferably rotating, then cuts the pair 13 of continuous strips 4 at the cutting gap 49, the cutting blade 50 advantageously being in abutment against the edge of the stacking surface.

The cell 47 formed from the terminated stack of electrodes and separators is then removed by the arm of the robot 48 and a new cell 47 can be formed on the folding head 6.

Figure 7:
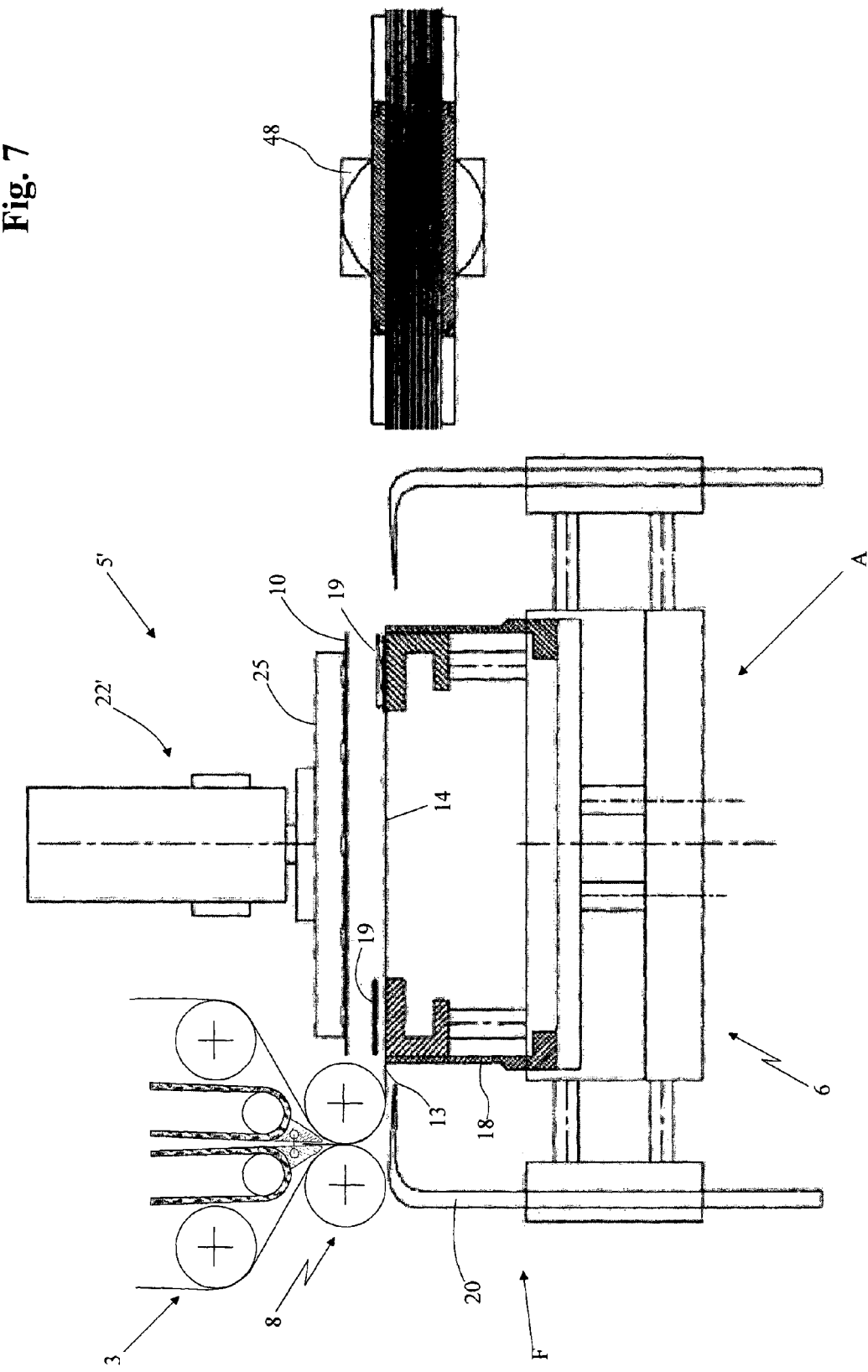
FIG. 7 shows the folding head of FIG. 3 in a frontal view during an initial step for forming a new stack of electrodes and separators.

For such purpose, the head 6 is brought into the first position A, whereas the front folding blades 19, front with respect to the advancing direction of the folding head 6 itself, are in the interference position C, in order to retain the free end edge of the pair 13 of continuous strips 4. During the movement of the head 6 towards the first position A, a first composite layer 14, formed by a section of the pair 13 of continuous strips 4 with a second electrode 12 interposed, is deposited on the stacking surface 7, which was previously brought back into the initial position, as illustrated in FIG. 7. The first transport device 22' then deposits a first electrode 10 on the first composite layer 14. During the latter operation, both pairs of folding blades 19 are slightly lifted and translated along the respective preferred extension directions Y and Y' towards a position of non-interference D, as illustrated in FIG. 8, in order to then be newly arranged in the interference position C above the first electrode 10 which was deposited by the first transport device 22', as illustrated in FIG. 9. Advantageously, the folding blades 19 are actuated to be moved towards the non-interference position D and then towards the new interference position C while the first transport device 22' is depositing the first electrode 10 on the composite layer 14, such that it is the first transport device 22' itself to exert, in this time period, a mechanical action of retention on the stack of electrodes and separators being formed. This in order to prevent, during the movement of the folding blades 19, undesired movements of the composite layer 14 and of the second electrode 12 comprised therein, as well as of the first electrode 10.

The folding head 6 is then actuated to be moved from the first position A towards the second position B, as illustrated in FIG. 9. As specified above, along an initial section of the travel of the trolley 17 of the head 6 from the first position A to the second position B, the stacking portion 58 of the head 6 is actuated to be moved from the advanced position S to the receded position R, as illustrated in FIG. 9, with the pair of front folding blades 19, front with respect to the advancing direction of the folding head 6, arranged in the interference position C. The stacking portion 58 is actuated to be moved towards the receded position R until the pair of front folding blades 19 reaches the emission mouth 59 of the coupling means 8, i.e. it is arranged below the latter. Subsequently, the stacking portion 58 is actuated to be newly moved towards the advanced position S and it then remains in the latter position until the trolley 17 has reached the second position B. During such movement, the front folding blades 19, front with respect to the advancing direction of the head 6, assisted by the movement of the stacking portion 58 of the head 6, facilitate the formation of a fold 45 on the pair of continuous strips 4. The front locking clamp 20, front with respect to the advancing direction of the head 6, is then brought into the engagement position E, advantageously when the folding head 6 has completed about half the distance between the first position A and the second position B, in order to retain in position the second electrode 12 comprised in the composite layer 14 of the pair 13 of continuous strips 4 that the feeding means 3 are releasing on the folding head 6, as illustrated in FIGS. 10 and 11. When the folding head 6 has reached the second position B, the second transport device 22" deposits, on the composite layer 14, a first electrode 10, as illustrated in FIG. 11. During the latter operation, the front locking clamp 20 is brought towards a non-engagement position F and both pairs of folding blades 19 are slightly lifted and translated along the respective preferred extension directions Y and Y' towards a non-interference position D, before then being newly arranged in the interference position C above the first electrode 10 that was deposited by the second transport device 22". Advantageously, the locking clamp 20 is actuated to be moved towards the non-engagement position F and the folding blades 19 are actuated to be moved towards the non-interference position D and then towards the new interference position C while the second transport device 22" is depositing the first electrode 10 on the composite layer 14, such that the second transport device 22' exerts a mechanical action of retention on the stack of electrodes and separators being formed, preventing, during the movement of the locking clamp 20 and the folding blades 19, undesired movements of the composite layer 14 and of the second electrode 12 comprised therein, as well as of the first electrode 10. The above-described operations are then repeated until a cell 47 is obtained having the desired size, i.e. comprising the desired number of first and second electrodes.

Illustrated in the enclosed figures is a machine 1 according to the present invention adapted to stack first and second electrodes 10 and 12, both in sheet form. More in detail, illustrated in the enclosed figures is a machine 1 adapted to stack first and second electrodes 10 and 12 both in precut sheet form and drawn from respective storage areas (FIG. 1), or adapted to stack first and second electrodes 10 and 12 both in sheet form obtained by means of cutting respective continuous strips of substrate material for electrodes partially coated with an active coating (FIG. 2). Of course, without departing from the protective scope defined in the present patent, the first and the second electrodes can be separately provided, with the first in precut sheet form and the others obtained via cutting in machines 1 starting from a continuous strip.

In addition, the second electrodes 12 intended to be inserted between the two continuous strips 4 of dielectric material can otherwise be defined on circumscribed areas of a continuous strip of substrate material for electrodes, by means of the deposition of an active coating on such continuous strip only at the aforesaid circumscribed areas. The second electrodes 12 would in such case be formed on the continuous strip of substrate material for electrodes by the depositing of the active coating on a plurality of areas spaced from each other, along the preferred extension direction of the continuous strip of substrate material for electrodes.

In accordance with a non-illustrated embodiment of the machine 1 according to the present invention adapted to stack first electrodes 10 in sheet form and second electrodes 12 defined on circumscribed areas of a continuous strip of substrate material for electrodes, as specified above, the third distribution apparatus 11 of second electrodes 12 of the machine 1 comprises a reel (not illustrated) susceptible to support a winding of the strip of substrate material for electrodes on which a plurality of second electrodes 12 are defined and a device for transferring the strip of second electrodes 12 to the coupling means 8 of the feeding apparatus 3, in order to insert the strip itself between the internal faces 9 of the two continuous strips 4 of dielectric material.

The machine 1 in accordance with the present invention therefore allows obtaining cells for electric storage batteries with high productive capacity, being adapted to simply and quickly deposit composite layers 14 formed by sections of the pair 13 of continuous strips 4 with an second electrode 12 interposed alternated with first electrodes 10. The machine 1 in accordance with the present invention is thus more efficient than the machines of known type, allowing the simultaneous deposition of two separators and one second electrode 12 by translating the folding head 6 from the first position A to the second position B or vice versa.

In addition, the machine 1 according to the invention, due in particular to the presence of the folding blades 19, and preferably also of the locking clamps 20, of the first and the second transport device 22', 22", as well as of means for drawing the stack formed, such as in particular the arm of a robot 48 as described above, allow exerting a mechanical retention action in a substantially continuous manner on the stack of electrodes and separators during the formation thereof and also at the end of the formation thereof, preventing the latter from being moved and ensuring the maintenance of the optimal alignment initially conferred thereto. In particular, the machine 1 is adapted to substantially constantly exert a mechanical retention action on the stack of electrodes and separators up to the end of the formation thereof and up to the consequent winding of the formed stack in a double-sided adhesive strip, in order to allow a facilitated movement thereof during the subsequent processing steps.

The machine 1 according to the present invention is therefore adapted to obtain stacks of electrodes and separators that are optimally aligned with each other, employing any type of separator, without it being required to use, for example, thermo-adhesive separators, and also without requiring the obtainment of fixing points or lines between the continuous strips 4 of dielectric material in order to maintain the electrodes inserted between them in the correct position.

In addition, due to the fact that the continuous strips 4 of dielectric material remain separated from each other along the entire extension thereof, even in the formed stack, the electrolytic solution is able to easily penetrate into the interstices between them, also reaching the electrodes interposed therebetween.

A process for obtaining cells for electric storage batteries also forms the object of the present invention.

In order to facilitate the description, the reference numbers used up to now will be maintained, where reference is made to the same elements. The process according to the present invention comprises the operative steps described hereinbelow in detail.

First, a step is provided for obtaining a pair 13 of continuous strips 4 of dielectric material that are parallel and facing over respective internal faces 9 and provided with two external faces 41 and 42 oriented with opposite directions, with a plurality of second electrodes 12 interposed between the internal faces 9, equidistant along the extension Z of the pair 13 of continuous strips 4.

In particular, the second electrodes 12 are arranged along the extension Z of the pair 13 of continuous strips 4 with the current transport collectors 43" projecting from the pair 13 of continuous strips 4 along a same side, parallel to the preferred extension direction Z of the continuous strips 4. In addition, if the second electrodes 12 are supplied in precut sheet form and the current transport collectors 43" are defined by a tongue projecting from one side of each of the second electrodes 12, as illustrated in FIG. 1, each pair of adjacent second electrodes 12, along the extension Z of the pair 13 of continuous strips 4, is arranged with the electrical collectors 43" arranged mirrored, as illustrated in FIG. 14a.

In a folding step, the pair 13 of continuous strips 4 of dielectric material with the second electrodes 12 interposed is folded in succession along a plurality of folding lines L orthogonal to the preferred extension direction Z of the two continuous strips 4. Each of the folding lines L is in substantially intermediate position between two consecutive second electrodes 12. The succession of folds defines a plurality of support surfaces 44 alternately on the two external faces 41 and 42 of the two continuous strips 4, as is visible in FIG. 14d, with each of such support surfaces 44 superimposed on one of the second electrodes 12 interposed between the two continuous strips 4.

Figure 14C:
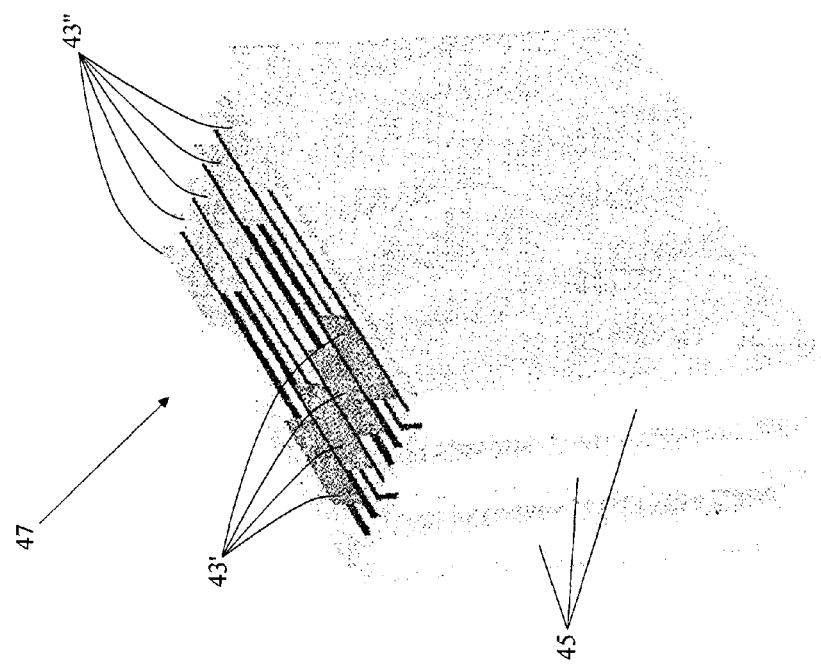

Following the folding step, the second electrodes 12 are stacked with the current transport collectors 43" aligned, as is visible in FIG. 14c.

The process also comprises a step for depositing, in succession, a plurality of first electrodes 10, having opposite polarity with respect to the polarity of the second electrodes 12, each on one of the aforesaid support surfaces 44.

In particular, the first electrodes 10 are deposited on the support surfaces 44 with the current transport collectors 43' projecting all on a same side of the stack. If the first electrodes 10 are supplied in precut sheet form and their current transport collectors 43' are defined by a tongue projecting on one side of each of the each dei first electrodes 12, as illustrated in FIG. 1, the first electrodes 10 are advantageously deposited on the support surfaces 44 with the current transport collectors 43' projecting on the same side of the stack on which the current transport collectors 43" of the second electrodes 12 project, aligned spaced from the latter, as illustrated in FIG. 14c.

Otherwise, the first electrodes 10 can be deposited on the support surfaces 44 with the current transport collectors 43' projecting on the side of the stack opposite the side on which the current transport collectors 43" of the second electrodes 12 project.

More in detail, the folding step and the depositing step are each constituted by a plurality of passages that are alternately executed. In particular, the folding step comprises a plurality of folding passages, during each of which the pair 13 of continuous strips 4 of dielectric material with the second electrodes 12 interposed is folded along a folding line L, defining a support surface 44 on one of the external faces 41 and 42. The depositing step comprises a plurality of depositing passages, during each of which a first electrode 10 is deposited on the support surface 44 defined by the preceding folding passage.

More clearly, upon each folding passage, a depositing passage follows for depositing a first electrode 10 on the support surface 44 defined on one of the two external faces 41 or 42 by the folding passage.

Preferably, the step for obtaining a pair 13 of continuous strips 4 of dielectric material that are parallel with a plurality of second electrodes 12 interposed comprises a step for unwinding the two continuous strips 4 of dielectric material from two respective reels 37 and a step for cutting the two continuous strips 4 of dielectric material, advantageously at the end of the formation of the cell 47, constituted by the desired number of stacked first and second electrodes.

The described process allows obtaining cells for storage batteries in a particularly quick and simple manner, since with only one folding passage, two separators 24 and one second electrode 12 comprised between the two separators 24 are simultaneously deposited on the stack of electrodes and separators being formed.

Such process is therefore provided with decidedly higher efficiency than the known zigzag stacking processes, which provide for depositing only one separator with each folding passage.

Also forming the object of the present invention is a cell 47 for electric storage battery, which comprises a plurality of first electrodes 10, having a same polarity, and a plurality of second electrodes 12 having a same polarity, opposite the polarity of the first electrodes 10. The first electrodes 10 and the second electrodes 12 are alternately stacked on each other and the cell 47 also comprises a plurality of separators 24 interposed between the first and the second electrodes and defined by a plurality of portions of one or more continuous strips 4 of dielectric material.

According to the idea underlying the present invention, the separators 24 are defined by portions of two continuous strips 4 of dielectric material which are coupled, facing over respective internal faces 9 and equipped with two external faces 41 and 42 oriented with opposite directions. A plurality of the second electrodes 12 are interposed between the internal faces 9 of the two continuous strips 4, equidistant along the extension of the pair of continuous strips 4. The pair of continuous strips 4 is folded into a plurality of folds 45, each obtained along a folding line L orthogonal to the preferred extension direction Z of the two continuous strips 4 of dielectric material and in substantially intermediate position between two of the consecutive second electrodes 12 to form a plurality of superimposed and parallel layers and defining, on the two opposite sides of the cell 47 between the folds 45, a plurality of pockets 46 containing the first electrodes 10.

The finding thus conceived therefore achieves the preset objects.

Of course, in the practical obtainment thereof, it can assume forms and configurations that are different from that described above, without departing from the present protective scope.

In addition, all details can be substituted by technically equivalent elements and the sizes, shapes and materials employed can be of any type as required.

The invention claimed is:

1. Machine for obtaining cells for electric storage batteries, which comprises:
   a support structure set on the ground;
   a feeding apparatus for feeding at least one continuous strip of dielectric material, mounted on said support structure;
   a first and a second distribution apparatus for distributing electrodes, wherein said first and said second distribution apparatus are mounted on said support structure;
   a folding head mounted on said support structure and provided with a stacking surface susceptible to receive said at least one continuous strip of dielectric material from said feeding apparatus, and such folding head is movable between a first position and a second position translated with respect to said first position along a direction orthogonal to a lying surface of said at least one continuous strip of dielectric material released from said feeding apparatus in order to obtain a plurality of layers with said electrodes interposed;
   wherein:
   said feeding apparatus is adapted to release, on said folding head, two continuous strips of dielectric material and comprises coupling means for coupling said two continuous strips in their extension with respective opposite internal faces;

said first distribution apparatus and said second distribution apparatus are adapted to distribute first electrodes having the same polarity;

said machine comprising at least one third distribution apparatus for distributing second electrodes having opposite polarity with respect to the polarity of said first electrodes, such third distribution apparatus adapted to transfer said second electrodes to said coupling means of said feeding apparatus, between the internal faces of said two continuous strips of dielectric material, spaced from each other, said feeding apparatus being adapted to release towards said folding head said pair of continuous strips with said second electrodes interposed that are spaced from each other along an extension direction of said two continuous strips, said folding head, with each passage between said first position and said second position, being adapted to receive from said feeding apparatus a composite layer formed by a section of said pair of continuous strips containing one of said second electrodes and being susceptible to form a fold between two successive layers of said composite layers, and said folding head being adapted to receive on said composite layer one of said first electrodes from said first distribution apparatus when it is situated in said first position and one of said first electrodes from said second distribution apparatus when it is situated in said second position in order to form, on said stacking surface, a stack composed of said composite layers alternated with said first electrodes.

2. Machine according to claim 1, wherein said at least one third distribution apparatus of said second electrodes comprises:

supply means for supplying said second electrodes in succession; and a transfer device for transferring second electrodes, adapted to receive said second electrodes from said supply means and to transfer them, one after the other and equidistant from each other, to said coupling means of said feeding apparatus, in order to insert them between the internal faces of said two continuous strips of dielectric material.

3. Machine according to claim 2, wherein said supply means are adapted to transfer said second electrodes in sheet form to said transfer device, and they comprise:

at least one third storage area for containing said second electrodes in precut sheet form; and at least one third transport device, susceptible to draw said second electrodes from said at least one third storage area and transfer them to said transfer device.

4. Machine according to claim 2, wherein said supply means are adapted to transfer said second electrodes in sheet form to said transfer device, and they comprise:

at least one third reel susceptible to support a winding of a continuous strip of substrate material for electrodes, and on at least one portion of such continuous strip, along the extension direction of said strip, an active coating is deposited for forming said second electrodes; and at least one third cutting device, susceptible to cut said continuous strip of substrate material for electrodes partially coated with said active coating in order to separate portions of said continuous strip, each of such portions adapted to define one of said second electrodes; and at least one third transport device, susceptible to draw said second electrodes separated by said continuous strip of substrate material for electrodes from said third cutting device and release them to said transfer device.

5. Machine according to claim 3, wherein said at least one transfer device comprises two first conveyor belts, each provided with an support portion adapted to receive one of said second electrodes in sheet form from said at least one third transport device, said two first conveyor belts being arranged side-by-side, defining between them a channel for transferring said second electrodes to the coupling means of said feeding apparatus and being adapted to guide both second electrodes based on the respective support portions towards said channel in order to transfer them to said coupling means.

6. Machine according to claim 5, wherein said channel for transferring said second electrodes to the coupling means of said feeding apparatus is defined between respective guide portions of said two first conveyor belts, which are extended substantially orthogonally from said support portions.

7. Machine according to claim 5, wherein said two first conveyor belts are aspirated in order to maintain the second electrodes, based on said support portions and conveyed through said channel, in the position in which they were transferred to said first conveyor belts by said at least one third transport device.

8. Machine according to claim 1, wherein said third distribution apparatus of second electrodes comprises:

a reel susceptible to support said plurality of second electrodes in the form of a winding of a strip of substrate material for electrodes, on a plurality of areas of which, circumscribed and spaced from each other along the extension direction of said strip, an active coating is deposited that forms one of said second electrodes; and means for transferring said strip on which a plurality of said second electrodes are formed to said coupling means of said feeding apparatus, in order to insert said strip between the internal faces of said two continuous strips of dielectric material.

9. Machine according to claim 2, wherein said feeding apparatus comprises two fourth reels, each susceptible to support a winding of a respective strip of dielectric material, the coupling means of said feeding apparatus being susceptible to receive said strips of dielectric material from said fourth reels and said second electrodes from the transfer device of said third distribution apparatus and being adapted to transfer said two coupled continuous strips with said second electrodes interposed to said folding head.

10. Machine according to claim 9, wherein said coupling means comprise at least two counter-rotating rollers, which define a slit between them for the passage of said two continuous strips of dielectric material, with said second electrodes inserted between their internal faces, and they are susceptible to press said two continuous strips against each other, in order to firmly retain in position said second electrodes inserted between them.

11. Machine according to claim 1, wherein said first distribution apparatus and said second distribution apparatus respectively comprise:

a first reel and a second reel, each susceptible to support a winding respectively of a first continuous strip and a second continuous strip of substrate material for electrodes, and on at least one portion of each of such continuous strips, along the extension direction of said strip, an active coating is deposited for forming said first electrodes;

a first cutting device and a second cutting device, respectively susceptible to cut said first and said second continuous strip of substrate material for electrodes partially coated with said active coating, in order to separate portions of said first and said second continuous strip, each adapted to define one of said first electrodes; and a first transport device and a second transport device, susceptible to draw said first electrodes respectively separated from said first and from said second continuous strip of substrate material per electrodes and to release them on said folding head when the latter is respectively situated in said first position and in said second position.

12. Machine according to claim 1, wherein the coupling means of said feeding apparatus comprise an emission mouth through which said pair of continuous strips with said second electrodes interposed is released towards said folding head and said folding head comprises a trolley which is movable along said direction between said first position and said second position, and a stacking portion, comprising said stacking surface, which is mounted on said trolley movable along a direction (Z') parallel to said extension direction of said two continuous strips released by said feeding apparatus between a receded position, in which it is moved away from the emission mouth of said coupling means, and an advanced position, in which it is brought closer to the emission mouth of said coupling means, said stacking portion being arranged in said receded position for at least one section of the travel of said head between said first position and said second position, in order to maintain powered said pair of continuous strips, with said second electrodes interposed, released by said coupling means.

13. Process for obtaining cells for electric storage batteries, said process comprising the following operative steps:
   a step for obtaining a pair of continuous strips of dielectric material that are parallel and facing over respective internal faces and provided with two external faces (41, 42) oriented with opposite directions, with a plurality of second electrodes interposed between said internal faces of said two continuous strips, equidistant along the extension of said pair of continuous strips;
   a folding step, during which said pair of continuous strips of dielectric material with said second electrodes interposed is folded in succession along a plurality of folding lines orthogonal to the extension direction of said two continuous strips, each of said folding lines being in substantially intermediate position between two of said consecutive second electrodes, said succession of folds defining a plurality of support surfaces alternately on the two external faces of said two continuous strips, each of said support surfaces being superimposed on one of said second electrodes interposed between said two continuous strips;
   a step for depositing in succession a plurality of first electrodes having opposite polarity with respect to the polarity of said second electrodes, each on one of said support surfaces.

14. Process for obtaining cells for electric storage batteries according to claim 13, wherein said step for obtaining a pair of parallel continuous strips of dielectric material with a plurality of said second electrodes interposed comprises a step for unwinding said two continuous strips of dielectric material from two respective reels and a step for cutting said two continuous strips of dielectric material.

15. Machine according to claim 4, wherein said at least one transfer device comprises two first conveyor belts, each provided with an support portion adapted to receive one of said second electrodes in sheet form from said at least one third transport device, said two first conveyor belts being arranged side-by-side, defining between them a channel for transferring said second electrodes to the coupling means of said feeding apparatus and being adapted to guide both second electrodes based on the respective support portions towards said channel in order to transfer them to said coupling means.

16. Machine according to claim 15, wherein said channel for transferring said second electrodes to the coupling means of said feeding apparatus is defined between respective guide portions of said two first conveyor belts, which are extended substantially orthogonally from said support portions.

17. Machine according to claim 15, wherein said two first conveyor belts are aspirated in order to maintain the second electrodes, based on said support portions and conveyed through said channel, in the position in which they were transferred to said first conveyor belts by said at least one third transport device.

* * * * *

UNITED STATES PATENT AND TRADEMARK OFFICE
CERTIFICATE OF CORRECTION

| | | |
|---|---|---|
| PATENT NO. | : 9,991,547 B2 | Page 1 of 1 |
| APPLICATION NO. | : 14/403195 | |
| DATED | : June 5, 2018 | |
| INVENTOR(S) | : Pier Giuseppe Bernini et al. | |

It is certified that error appears in the above-identified patent and that said Letters Patent is hereby corrected as shown below:

Assignee (73) should be corrected as follows:
Change:
--SOVEMA GROUPS S.P.A.--
To:
"SOVEMA GROUP S.P.A."

Signed and Sealed this
Fourth Day of September, 2018

Andrei Iancu
*Director of the United States Patent and Trademark Office*